(12) United States Patent
Geist et al.

(10) Patent No.: US 12,197,373 B1
(45) Date of Patent: Jan. 14, 2025

(54) TEST, DEVELOPMENT AND DEPLOYMENT INFRASTRUCTURE FOR SPACECUBE HIGH-PERFORMANCE FLIGHT PROCESSORS

(71) Applicant: United States of America as represented by the Administrator of NASA, Washington, DC (US)

(72) Inventors: Alessandro Geist, Greenbelt, MD (US); Travis Wise, Greenbelt, MD (US); Cody Brewer, Greenbelt, MD (US); Nicholas Franconi, Greenbelt, MD (US); Christopher Wilson, Greenbelt, MD (US); Jonathan Boblitt, Greenbelt, MD (US); Robin Ripley, Greenbelt, MD (US); Alan Gibson, Greenbelt, MD (US); Manuel Buenfil, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 1010 days.

(21) Appl. No.: 17/173,557

(22) Filed: Feb. 11, 2021

Related U.S. Application Data

(60) Provisional application No. 62/975,867, filed on Feb. 13, 2020.

(51) Int. Cl.
*G06F 13/40* (2006.01)
*B64G 1/66* (2006.01)
(Continued)

(52) U.S. Cl.
CPC ............ *G06F 13/409* (2013.01); *B64G 1/66* (2013.01); *G06F 1/10* (2013.01); *G06F 13/1689* (2013.01);
(Continued)

(58) Field of Classification Search
CPC . G06F 13/409; G06F 13/4004; G06F 13/4068
(Continued)

(56) References Cited

U.S. PATENT DOCUMENTS

| | | | | |
|---|---|---|---|---|
| 6,459,411 | B2 * | 10/2002 | Frazier | .................. G01C 23/00 340/961 |
| 11,586,497 | B1 * | 2/2023 | Geist | ..................... B64G 1/223 |

(Continued)

*Primary Examiner* — Titus Wong
(74) *Attorney, Agent, or Firm* — Heather Goo; Matthew F. Johnston; Trenton J. Roche

(57) ABSTRACT

Software and hardware for monitoring, testing, and developing communication and electronic systems on spacecrafts. Several systems are provided to monitor, test, and control a next generation SpaceCube, including a RadHard Monitor (RHM), a Mini ASTM Board, an FMC+ ASTM Board, a Mini Evaluation Board, a MEZZ and an Automated Test Suite. The RHM are FPGA IP and hardware configured to monitor COTS components. The Mini ASTM Board connects a Mini Processor Card to an ASTM for electrical testing. FMC+ ASTM Card connects FMC and FMC+ test cards to the ASTM for electrical testing. A Mini Evaluation Board supplies all necessary power to the Mini Processor card. The MEZZ is a multi-use GSE test board that is compatible with several different development platforms in the SpaceCube to allow developers to develop and test their software. The Automated Test Suite provides functional testing of an assembled SpaceCube board.

20 Claims, 22 Drawing Sheets

(51) Int. Cl.
*G06F 1/10* (2006.01)
*G06F 13/16* (2006.01)
*G06F 13/38* (2006.01)

(52) U.S. Cl.
CPC ........ *G06F 13/1694* (2013.01); *G06F 13/382* (2013.01); *G06F 13/4004* (2013.01); *G06F 13/4068* (2013.01); *G06F 2213/0042* (2013.01)

(58) Field of Classification Search
USPC ........................................................ 710/305
See application file for complete search history.

(56) References Cited

U.S. PATENT DOCUMENTS

| | | | |
|---|---|---|---|
| 11,618,592 B1* | 4/2023 | Fraction | B64G 1/24 |
| | | | 701/13 |
| 2008/0165037 A1* | 7/2008 | Griffith | H04L 47/10 |
| | | | 341/61 |
| 2011/0107158 A1* | 5/2011 | Espinosa | G06F 11/106 |
| | | | 714/54 |
| 2013/0181809 A1* | 7/2013 | Lin | G05B 19/02 |
| | | | 340/4.3 |
| 2015/0370579 A1* | 12/2015 | Judd | G06F 11/1433 |
| | | | 713/100 |
| 2017/0082755 A1* | 3/2017 | Thomas | G01S 19/37 |
| 2017/0188013 A1* | 6/2017 | Presler | H04N 5/772 |
| 2018/0300652 A1* | 10/2018 | Izumi | G06N 3/08 |
| 2018/0321859 A1* | 11/2018 | Jung | G06F 13/16 |
| 2019/0155767 A1* | 5/2019 | Cheong | G06F 13/1694 |
| 2020/0051961 A1* | 2/2020 | Rickard | H01L 23/49822 |
| 2020/0258210 A1* | 8/2020 | Shen | G06T 1/20 |

* cited by examiner

TEST, DEVELOPMENT AND DEPLOYMENT INFRASTRUCTURE FOR SPACECUBE HIGH-PERFORMANCE FLIGHT PROCESSORS

CROSS-REFERENCE TO RELATED APPLICATION AND CLAIM OF PRIORITY

This application claims the priority of U.S. Provisional Patent Application No. 62/975,867, filed Feb. 13, 2020, which is incorporated herein by reference.

FIELD OF THE INVENTION

The present invention generally relates to communications and electronic systems for spacecrafts. In particular, the present invention provides software and hardware for monitoring, testing, and developing communication and electronic systems on spacecrafts.

BACKGROUND OF THE INVENTION

Communications and electronic systems used in spacecraft, such as space stations, space vehicles, small satellites, avionics, etc., face challenges generally not encountered by Earth based communication systems, such as radiation exposure and stringent piece part reliability requirements. Specifically, SpaceCube is a family of computers developed by the Science Data Processing Branch at NASA Goddard Space Flight Center, which has flight heritage on several missions including the Hubble Servicing Mission 4, MISSE-7, ISEM, Raven, and RRM3. A next generation SpaceCube (SpaceCube v3.0) uses both Radiation Hardened (RadHard) components or Radiation Tolerant (RadTol) components with Commercial Off the Shelf (COTS) components in order to provide reliability and high performance. The COTS components include a processor as well as a field-programmable gate array (FPGA). The COTS components are not specifically designed to operate in the harsh space environment, and therefore, must be monitored for radiation effects and other faults, to ensure reliable operation of the system. Due to the harsh space environment hardware and software are designed to allow for monitoring and testing of the SpaceCube to ensure proper functioning of the computer system.

SUMMARY OF THE INVENTION

The present invention provides software and hardware for monitoring, testing, and developing communication and electronic systems on spacecrafts. Several systems are provided to monitor, test, and control a next generation SpaceCube (SpaceCube v3.0). Those systems include: 1) a RadHard Monitor (RHM); 2) a Mini ASTM Board; 3) an FMC+ ASTM Board; 4) a Mini Evaluation Board; 5) a Mezzanine Test Card (MEZZ); and 6) an Automated Test Suite. The RHM are FPGA IP and hardware configured to monitor the COTS components to ensure overall reliability of the system. The Mini ASTM Board connects the SpaceCube v3.0 Mini Processor Card (Mini) to an Automated Safe-To-Mate Machine (ASTM) for electrical testing. The FMC+ ASTM Card connects FMC (FPGA Mezzanine Card) and FMC+ test cards to the ASTM for electrical testing. The Mini Evaluation Board supplies all necessary power to the Mini Processor card and breaks out (i.e., makes available to external connectors and harnessing) several common development interfaces to allow for developers to develop and test their software. The MEZZ is a multi-use GSE (Ground Support Equipment) test board that is compatible with several different development platforms in the SpaceCube v3.0 ecosystem to allow developers to develop and test their software. The Automated Test Suite provides functional testing of the assembled SpaceCube board.

BRIEF DESCRIPTION OF THE DRAWINGS

The foregoing background and summary, as well as the following detailed description of the drawings, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENTS

Figure 1:
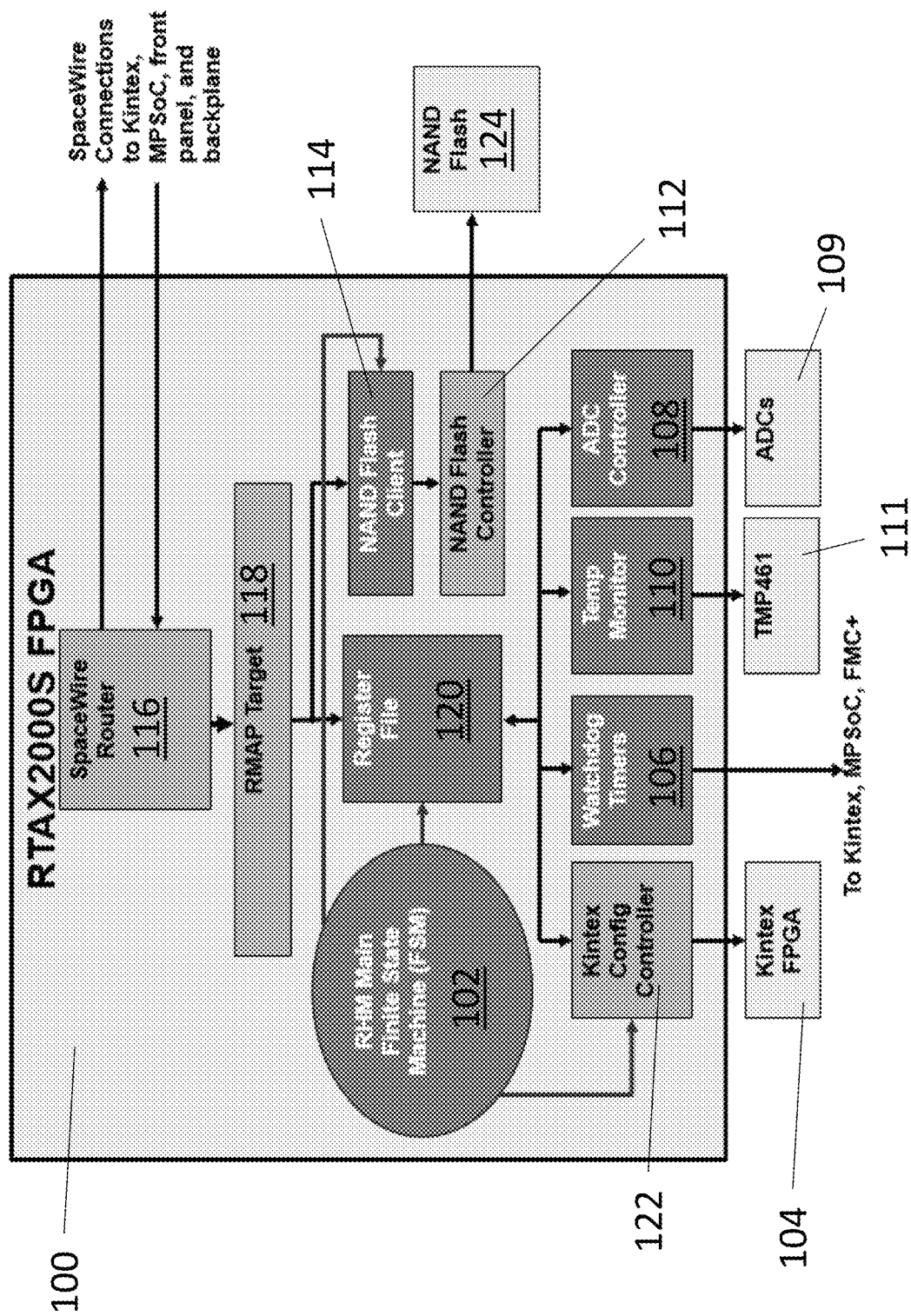
FIG. 1 is a diagram showing an RHM architecture of the SpaceCube v3.0 VPX.

The exemplary embodiment(s) of the present invention will now be described with the reference to accompanying drawings. The following description of the preferred embodiment(s) is merely exemplary in nature and is in no way intended to limit the invention, its application, or uses.

For purposes of the following description, certain terminology is used in the following description for convenience only and is not limiting. The characterizations of various components and orientations described herein as being "front," "back," "vertical," "horizontal," "upright," "right," "left," "side," "top," "bottom," or the like designate directions in the drawings to which reference is made and are relative characterizations only based upon the particular position or orientation of a given component as illustrated. These terms shall not be regarded as limiting the invention. The words "downward" and "upward" refer to position in a vertical direction relative to a geometric center of the apparatus of the present invention and designated parts thereof. The terminology includes the words above specifically mentioned, derivatives thereof and words of similar import. As used herein "board" and "card" are used interchangeably to indicate a circuit board, preferably a printed circuit board (PCB).

Several systems are provided to monitor, test, and control the next generation SpaceCube (SpaceCube v3.0). Those systems include: 1) a RadHard Monitor (RHM); 2) a Mini ASTM (Automated Safe-To-Mate) Board: 3) an FMC (FPGA Mezzanine Card)+ ASTM Board; 4) a Mini Evaluation Board; 6) a Mezzanine Test Card (MEZZ); and 6) an Automated Test Suite. As explained in further details below, the RHM are FPGA IP and hardware configured to monitor the COTS components to ensure overall reliability of the system. As explained in further details below, the Mini ASTM Board connects the SpaceCube v3.0 Mini Processor Card (Mini) to the Automated Safe-To-Mate Machine (ASTM) for electrical testing. As explained in further details below, the FMC+ ASTM Card connects cards conforming to the FMC and FMC+ standards to the Automated Safe-To-Mate Machine (ASTM) for electrical testing. As explained in further details below, the Mini Evaluation Board supplies all necessary power to the Mini Processor card and breaks out (i.e., makes available to external connectors and harnessing) several common development interfaces to allow for developers to develop and test their software. As explained in further details below, the MEZZ is a multi-use GSE (Ground Support Equipment) test board that is compatible with several different development platforms in the SpaceCube v3.0 ecosystem to allow developers to develop and test their software. As explained in further details below, the Automated Test Suite provides functional testing of an assembled SpaceCube board.

I. RadHard Monitor (RHM)

The RadHard Monitor (RHM) is a Field Programmable Gate Array (FPGA) IP (Intellectual Property) that is developed to support the SpaceCube v3.0 VPX processor card and the SpaceCube v3.0 Mini processor card. SpaceCube is a family of computers developed by the Science Data Processing Branch at NASA Goddard Space Flight Center. It combines both Radiation Hardened (RadHard) components or Radiation Tolerant (RadTol) components with Components Off the Shelf (COTS) in order to provide reliability and high performance. SpaceCube has flight heritage on several missions including the Hubble Servicing Mission 4, MISSE-7, and RRM3. The next version of SpaceCube, the SpaceCube v3.0 VPX processor card, will preferably feature a Xilinx Zynq Ultrascale+ Multi-Processor System on a Chip (MPSoC) device and a Xilinx Kintex Ultrascale FPGA. These two parts are COTS components and will therefore need to be monitored for radiation effects and other faults. In addition, a smaller variant of SpaceCube v3.0 Processor Card, the SpaceCube v3.0 Mini processor card will feature only the Kintex Ultrascale FPGA. Both versions of SpaceCube v3.0 provides the RHM in order to monitor the COTS components, thereby improving the overall reliability of the system. Thus, the RHM is a separate FPGA device and the IP running on it. Moreover, the RHM device is selected to have a higher radiation tolerance than the main processing device, which would be the Kintex FPGA on the SpaceCube v3.0 Mini Processor. The RHM is critical to the operation of both the SpaceCube v3.0 processor cards because it enables the use of these high-performance parts in the harsh environment of space.

The RHM FPGA IP design is programmed onto an RTAX RadHard FPGA 100 on the SpaceCube v3.0 VPX processor card (see FIG. 1). This FPGA is a one-time-programmable anti-fuse based FPGA. On the SpaceCube v3.0 Mini, the RHM is programmed onto a flash based RadTol RTProASIC FPGA 200 (see FIG. 2). These two FPGA devices are more resilient to radiation effects, allowing the RHM, and by extension the SpaceCube v3.0 cards, to be more suitable for spaceflight.

Referring to FIG. 1, the design of the RHM includes a Finite State Machine (FSM) 102 that handles the startup behavior and helps configure and scrub a Kintex FPGA 104. Scrubbing is a process in which the RHM corrects errors or faults in the Kintex FPGA 104 by rewriting its configuration data. The Kintex FPGAs are reconfigurable devices, and the scrubbing process can be performed while the FPGA is operating without interference. The RHM also contains the following components: two to six watchdog timers 106, a SelectMAP (SMAP) controller or Kintex Config Controller (programming controller IP core) 122, as shown in FIG. 1, an ADC (Analog/Digital Converter) controller 108, a temperature monitor controller 110, a NAND flash memory controller 112 and client 114, a SpaceWire router 116, a Register file 120, and a Remote Memory Access Protocol (RMAP) target 118. All these components are controllable through the SpaceWire router 116 in conjunction with the RMAP target 118 and the register file 120. The main FSM 102 also has access to the NAND flash controller 112, SMAP controller 122, and the register file 120 in order to perform all of its functions. Electronic communications between the components are described below.

Figure 2:
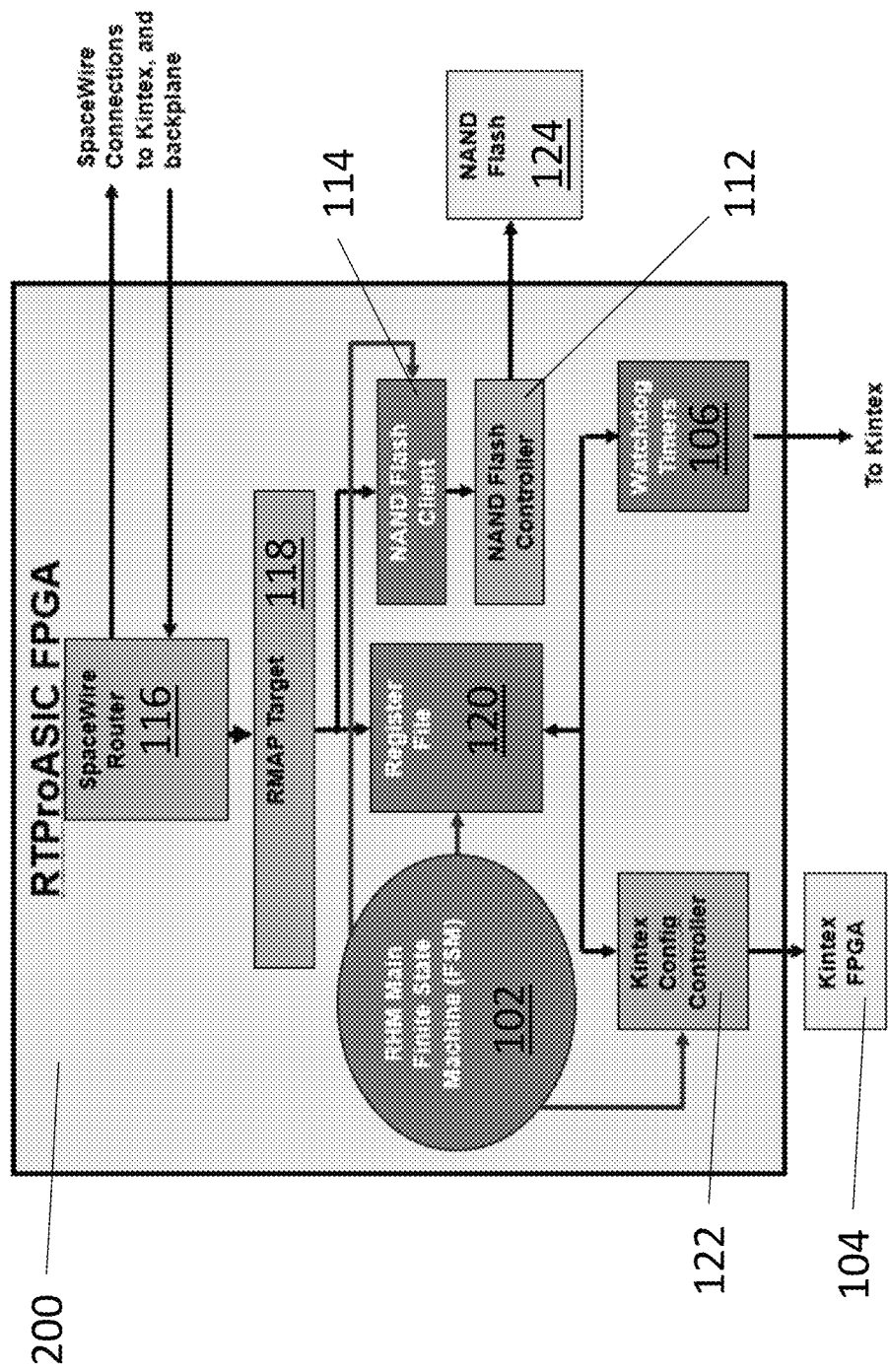
FIG. 2 is a diagram showing the RHM architecture of the SpaceCube v3.0 Mini.

Referring to FIG. 2, the RHM on the SpaceCube v3.0 Mini (Mini) is slightly different. The core functionality is the same, but the ADC controller 108 and temperature monitor 110 have been removed. There are also only two out of six watchdog timers 106 available. The RHM on the Mini is not responsible for power sequencing. Thus, the RHM on the Mini includes the following components (components similar to those on the SpaceCube v3.0 are given the same reference numerals): the Finite State Machine (FSM) 102, multiple watchdog timers 106, the SelectMAP (SMAP) controller, shown as the Kintex Config Controller 122 in FIG. 1, the NAND flash memory controller 112 and the client 114, the SpaceWire router 116, the Register file 120, and Remote Memory Access Protocol (RMAP) target 118. Electronic communications between the components are described below.

Main Finite State Machine (FSM)

The FSM 102 is the portion of the RHM that is responsible for configuring itself, programming and scrubbing the Kintex FPGA 104. In SpaceCube v3.0 it is also responsible for powering on all the components on the board in the correct order.

Figure 3:
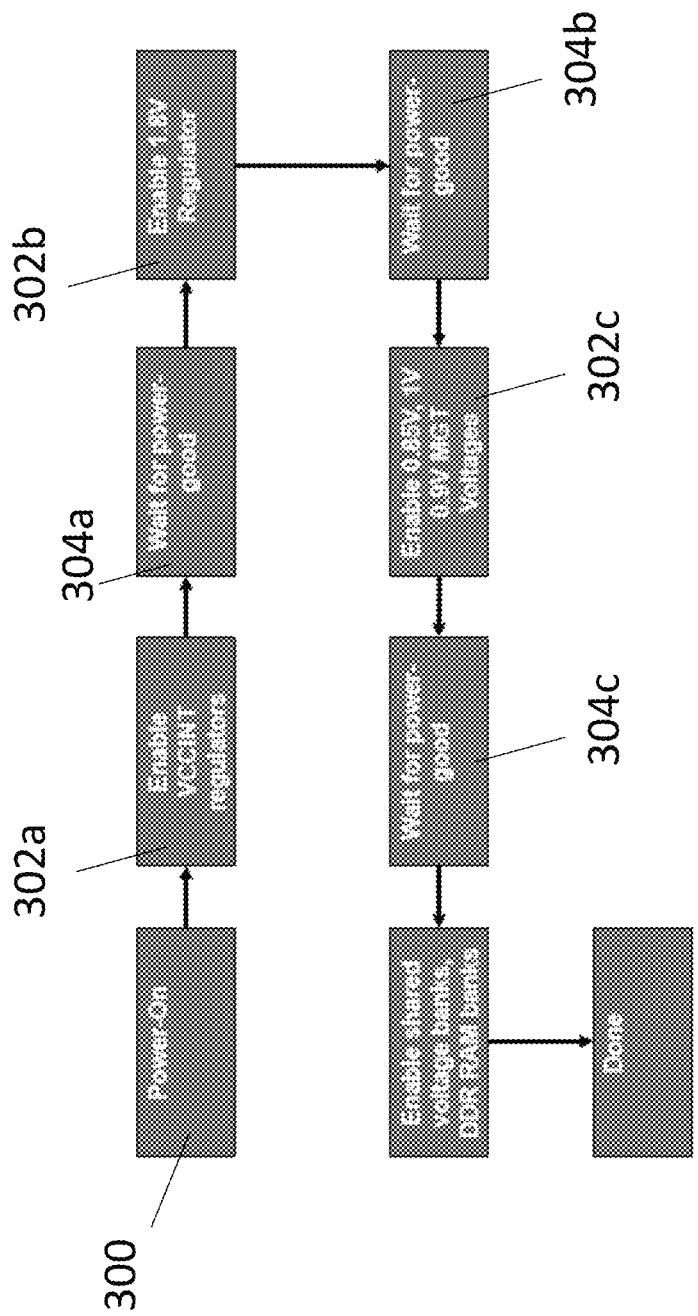
FIG. 3 is a flow chart showing the powering sequence for SpaceCube v3.0.

Referring to FIG. 3 which illustrates the powering order on the SpaceCube v3.0 board, when the SpaceCube v3.0 processor card powers on (box 300), the RHM is the first thing that is turned on. The FSM 102 is then responsible for turning on the other voltages of the board. The board's voltages need to be powered on in a specific order otherwise the COTS components, e.g., Xilinx devices, may not function properly. The components on the SpaceCube boards require specific amounts of voltages. These voltages used by the components are also referred to as voltage banks in FIG. 3. This is controlled by several components on the board called a voltage regulator. Most of the voltage regulators have an enable signal that is set by the RHM. After setting the signal, the regulators turn on (box 302a, 302b, 302c) and provide power to part of the board associated with the regulators. Once the regulator does this, it sends a feedback signal to the RHM called "power-good" (box 304a, 304b, 304c) which tells the RHM that the voltage rail has turned on successfully. After getting the signal the RHM can then continue to move on to the next regulator. This process is repeated for each of the twelve regulators until the whole board is powered on. FPGAs typically have specific power sequencing requirements that dictate the order in which the voltage rails should be turned on, and the RHM is responsible for turning them on in the correct order. This portion of the state machine also gives the RHM the ability to restart the Kintex FPGA and the MPSoC in the event a failure occurs. Should the RHM fail to power-on the board, the RHM will stop its boot sequence and will record which regulator has failed in its telemetry.

Figure 4:
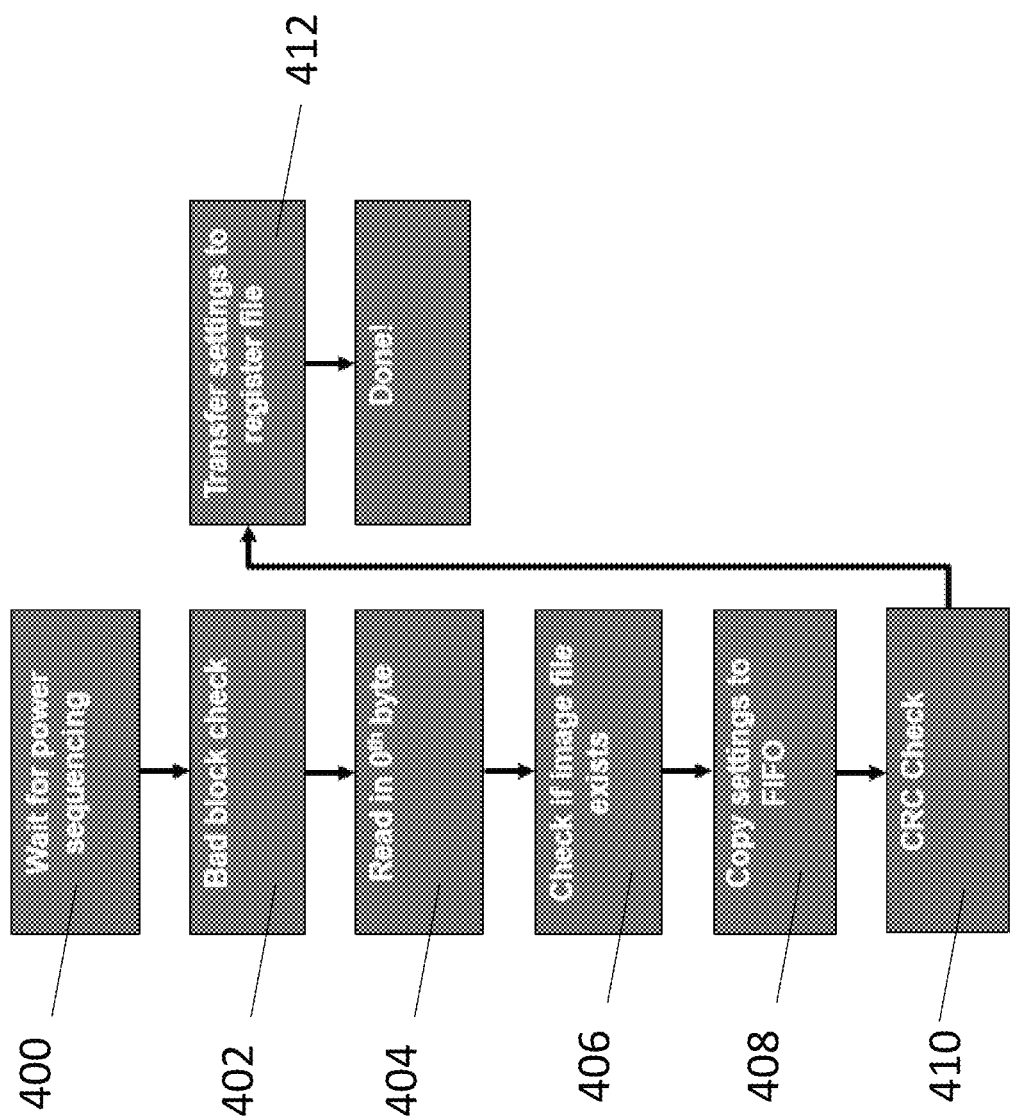
FIG. 4 is a flow chart showing the RHM settings loading sequence.

Referring to FIG. 4, once the rest of the board is powered on (box 400), the main FSM 102 must load all the configuration data for the RHM. This configuration data is stored in a NAND flash memory device 124 (see FIG. 1). The flash memory 124 attached to the RHM is segmented into multiple regions, each containing a single image file. Each region is made up of multiple units of memory called a block, which can be further divided into subsections called pages. An image file contains both the RHM configuration data, and the Kintex FPGA 104 data. The FSM 102 determines if there is an image file available (box 406) in the current memory region after verifying that the current block is not a factory-marked bad block. It determines there's an image present by first reading in the $0^{th}$ byte of the $0^{th}$ page in the current block and determines if its set to the number 138. If it is set to 138 then the image file is present. If there is no image file present, the FSM will look in the next block of the NAND flash until it finds an image file. After verifying that an image file is present the FSM 102 reads in the settings data and stores it in in a type of internal memory called a FIFO (box 408). The FIFO is inside the FSM in the RHM. A Cyclic Redundancy Check (CRC) is computed for the data using a Linear Feedback Shift Register (LFSR) circuit inside of the RHM, which is then compared against the CRC stored in the flash to determine if it matches (box 410). Once the data is verified, the data is transferred from internal memory into the register file (box 412) where the RHM's configuration data are then applied.

Figure 5:
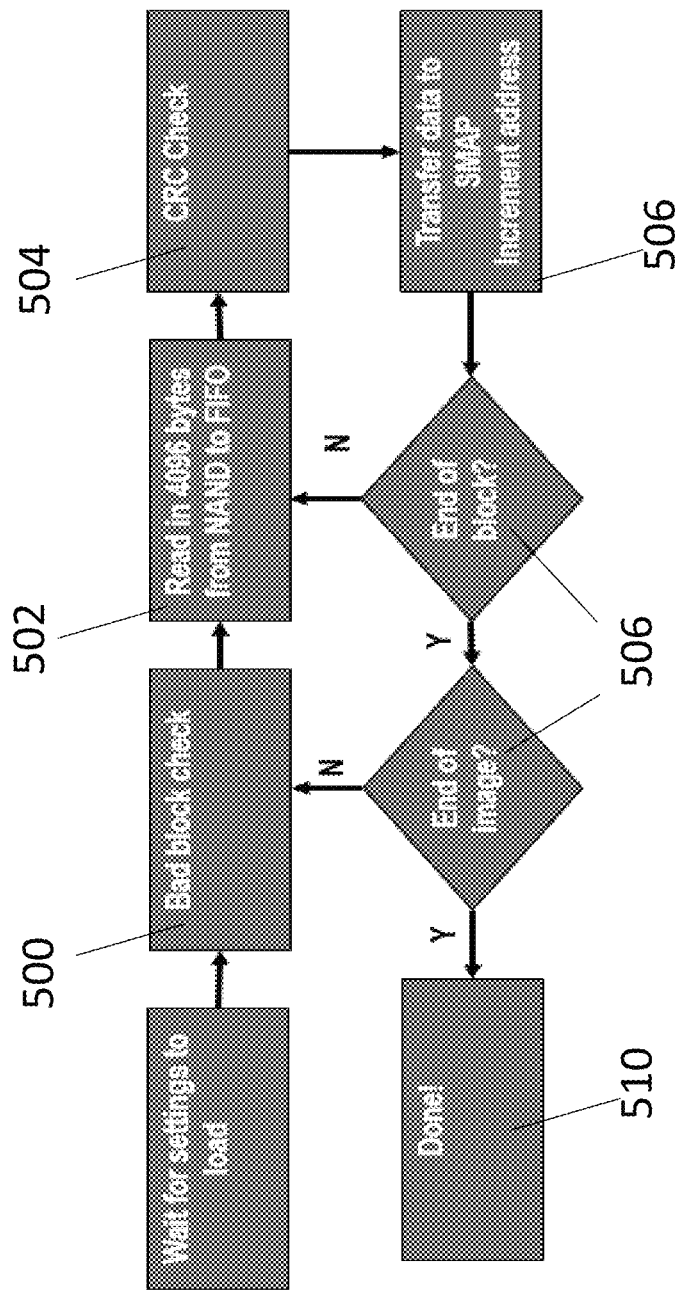
FIG. 5 is a flow chart showing a Kintex FPGA configuration sequence.

After loading the settings, the FSM 102 then configures the Kintex FPGA 104. In order to do this, a binary sequence must be sent to the Kintex FPGA 104. This binary sequence is referred to as a bitstream. This process is shown in FIG. 5. In order to send the bitstream to the Kintex FPGA 104, the RHM is electrically connected to the Kintex's SMAP port. This is an 8-bit wide parallel communication interface that the Kintex FPGA provides so a user can send or read back configuration data. A controller was reused from a previous project in order to communicate with this port. The main FSM 102 just needs to provide data to this controller by copying it from the NAND flash 124. Starting from the second block of the current flash memory region, the FSM 102 first verifies if the current block is valid (box 500) by sending the NAND flash commands to read in the block's data and see if the manufacturer has marked it as bad. It then reads in each page of the block into the FIFO (box 504). The pages are checked against a CRC (box 504) before being copied over to the SMAP controller, which then communicates with the SMAP port on the Kintex device (box 506). This process is repeated for the remaining blocks (boxes 508) in the image file before completing (box 510).

After configuring the Kintex FPGA 104 the main FSM 102 is now responsible for scrubbing the Kintex FPGA 104. The Kintex FPGA 104 may be a COTS or a RadTol part and are therefore susceptible to radiation effects. This can manifest as corruption of the bitstream inside the Kintex FPGA 104. In order to mitigate this, the RHM can resend the bitstream through the SMAP port. However, care must be taken in only sending only the first portion of the bitstream, which only contains the necessary configuration data. If any incorrect regions inside the Kintex FPGA 104 is overwritten, there exists a risk of causing the Kintex FPGA 104 to fail. This operation is referred to as scrubbing. There are two types of scrubbing: blind and on-demand. Blind scrubbing is when the RHM automatically scrubs the Kintex FPGA 104 after a period of time that is set by the user or mission. On-demand means that the Kintex FPGA 104 itself detects an error and sends a signal back to the RHM to let it know that it needs to be scrubbed. The scrubbing operation is accomplished by re-using the Kintex configuration portion of the FSM. The FSM just needs to re-send the first portion of the bitstream. After sending the configuration data in the bitstream to the SMAP controller the FSM stops and goes back to the idle state.

The FSM 102 also has some fault mitigation techniques in order to make sure the processor card has booted up correctly. This fault mitigation takes place during configuration of the Kintex FPGA. There are two main sources of errors during configuration or scrubbing: bad blocks, and data corruption. Bad blocks are identified and marked by the flash memory manufacturer before they are delivered. Bad blocks are marked with a certain value to let the user know not to use the block. The NAND flash 124 memory chips being used has eight (8) identical silicon dies inside of it. The memory is programmed such that each die is a redundant copy of each other. If the FSM encounters a CRC mismatch, data corruption, or a bad block, the FSM 102 switches to a different die and rereads the block or the page. The FSM 102 is effectively creating a valid image by splicing together different copies of an image.

Telemetry & Communications

One of the functions the RHM must perform is to provide telemetry for the mission when the mission requests it. This is accomplished using the GSFC SpaceWire router 116, the GSFC RMAP target 118, and the register file 120. The SpaceWire router 116 electrically connects the RHM to both Xilinx devices and to a couple external ports for communication with other mission-specific devices. The SpaceWire router 116 handles all the low level signaling of the SpaceWire router ports in addition to switching. The RMAP target 118 is an IP that defines a protocol on top of SpaceWire router 116 that allows the user to use RMAP packets for reading or writing telemetry. The target provides a local bus that the register file 120 and NAND flash 124 are attached to that allows for memory mapped transactions. The register file 120 is a set of memory elements that store all the settings and telemetry of the RHM. It also provides a means to control some of the peripherals in the RHM by writing to command registers. Command registers are a memory element in the register file that performs a command when they are written to by the user. By sending a single packet from the RMAP target 118 over the SpaceWire router 116 to read the register file, the mission can obtain all the telemetry and information of the RHM. Telemetry from the RHM includes the RHM's current state, its current configuration, and data from the ADC controllers and temperature monitor controller.

NAND Flash Controller & Client

Figure 6:
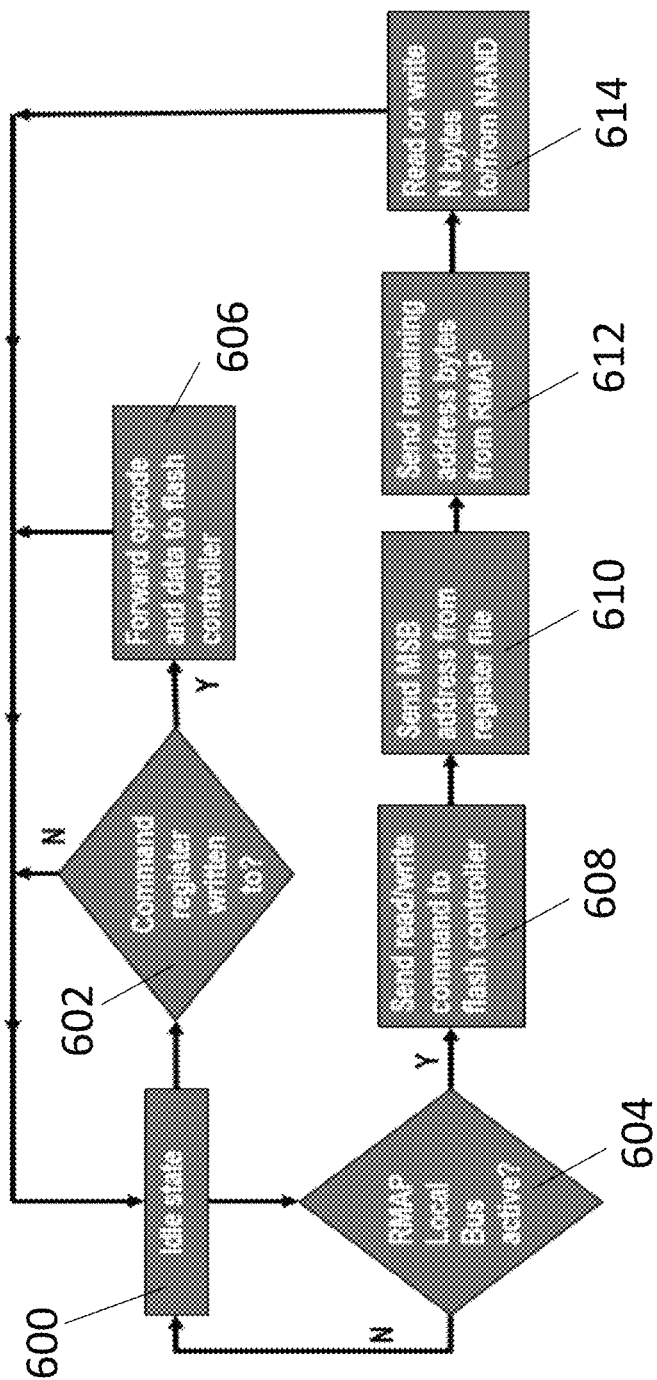
FIG. 6 is a flow chart showing a NAND flash client FSM operation.

The NAND flash memory device 124 is electrically connected to the NAND flash controller 112. This is a controller written by the Science Data Processing Branch at NASA Goddard that handles all the timing and signaling to the NAND flash 124. To use the controller 112, a client needs to be written in order to present the data and commands to the controller 112. As a result, a NAND flash client 114 is developed to provide two methods of communicating with the flash controller 112: memory mapped transactions through the RMAP target 118, and a manual control through the Register file 120. The RMAP target 118 allows for the mission to send one packet to read or write a large block of data to the NAND flash by sending a Space Wire packet using the RMAP protocol. The register file 120 provides a command register that allows the mission to specify manual commands to the flash client 114 through the SpaceWire port. These functions are handled through the NAND flash client which is shown in FIG. 6. The NAND flash client FSM is normally in idle state (box 600) and awaits commands from the Register file 120 (box 602) or the RMAP target 118 (box 604). Once it detects an RMAP transaction is occurring, it will then send a read or write command to the NAND flash device. It will then read in the address bytes, starting with the MSB from the register file, followed by the four remaining bytes from the RMAP local bus. These are sent to the NAND flash, Afterwards the flash client will then read or write data to the NAND flash. When a command is written to the Register file 120, the opcode and data are forwarded to the flash controller 112 (box 606). The opcode is a number that specifies what command you want the NAND flash to perform. Each command can have some data associated with it in order to perform its function.

Watchdog Timers

The RHM provides two to six watchdog timers for the user 106. A watchdog timer 106 is a circuit that the RHM provides which is used to detect if a device is frozen or malfunctioning. The device is designed to periodically pulse a signal called "heartbeat". The heartbeat signal is outputted from the device to the RHM. Failure to pulse the heartbeat signal in a specified time will trigger corrective action from the watchdog timer. The RHM's watchdog timers 106 has four different actions to take in case of failure to detect a heartbeat. The corrective action it takes is set by the user.

1 Set an error flag in the register file 120. This allows the mission to see that something happened in the telemetry and that a command needs to be sent in order to correct it.
2. Set an error flag and reset the device once. After setting the flag, the reset signal to the device is pulsed. Subsequent timeouts do not trigger resets until the error flag is cleared.
3. Set an error flag and reset the device for each timeout.
4. Set an error flag and reconfigure the device. This is only applicable for the Kintex FPGA.

Analog-to-Digital Converter (ADC) & Temperature Monitor Controllers

An ADC controller 108 and temperature monitor controller 110 are also developed for the RHM of the SpaceCube v3.0, which continuously sample the ADCs 109 and the temperature monitors 111, respectively on the processor card. The RHM supports up to four ADCs and one temperature monitor. Both devices use a serial protocol in order to communicate. After shifting in the data from the ADC or temperature monitor, the RHM then copies the data over to the register file 120 so it can be read by the mission.

II. Mini ASTM Board

Electrical Interface Continuity/Isolation Testing (EICIT Testing) is a vital part of verifying any new piece of hardware. This testing is typically performed on a printed circuit board (PCB) before it is powered, and ensures that there are no issues with the manufacture or assembly of the board. The scope of this testing is to take resistance measurements between each pair of external pins on the board and ensure that nets that are supposed to be connected have the correct resistance, and that nets that are not supposed to be connected are properly isolated. Conducting these tests by hand with a digital multimeter is common for small PCB designs, but for complex designs such as the Mini it quickly becomes unfeasible. The Mini backplane connector has 400 pins, and testing every possible combination of pins by band would take months or longer. An Automated Safe-to-Mate Machine (ASTM) developed at NASA GSFC, however, can make multiple checks per second, and does not need to be supervised while running, so engineers can "set it and forget it" for a few hours and come back later to review the results. The Mini ASTM Board of the SpaceCube v3.0 provides a compatible interface between a NASA SpaceCube v3.0 Mini Processor Card and the ASTM machine to enable testing of the Card.

Figure 7:
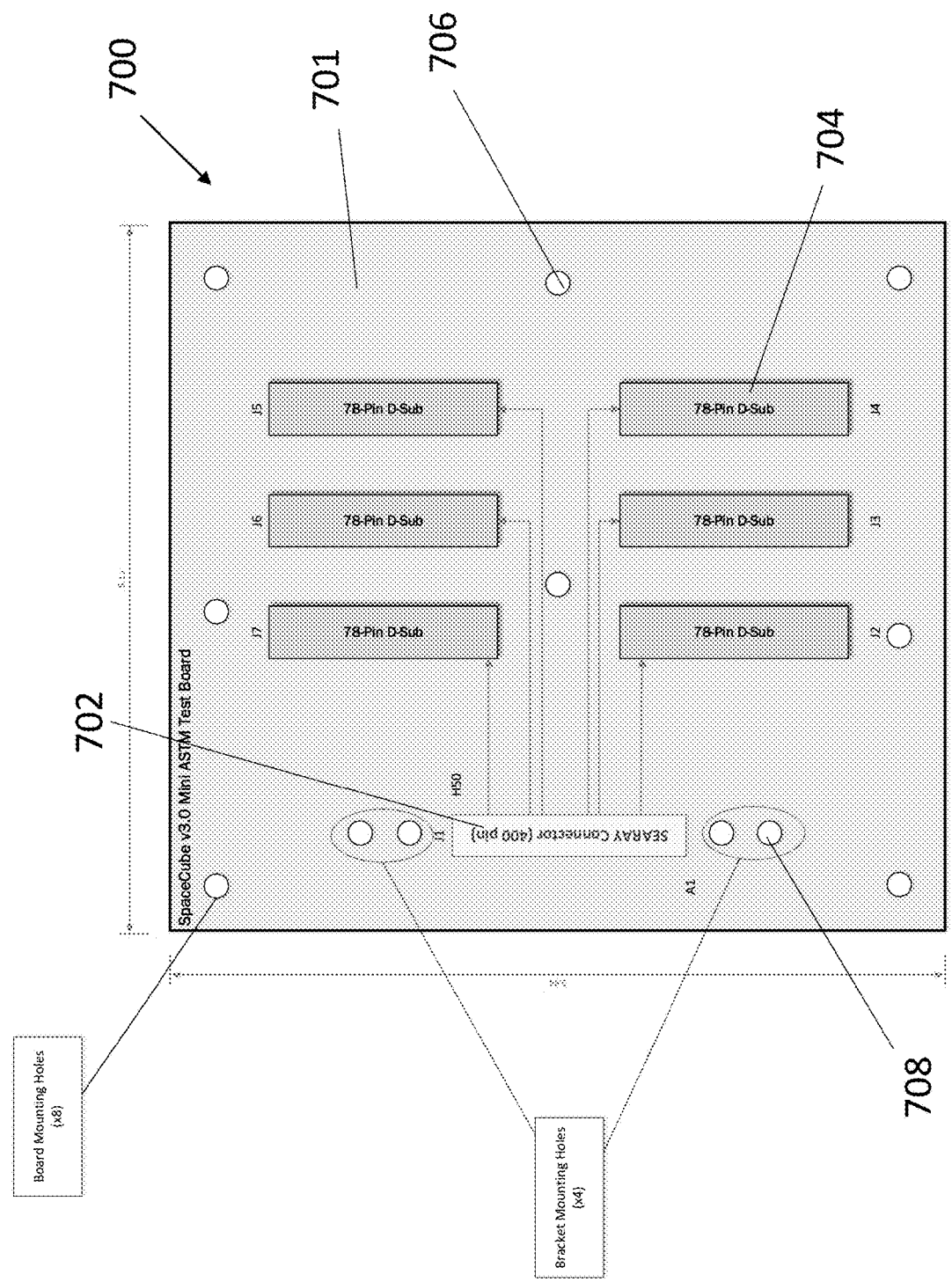
FIG. 7 is a block diagram showing the design of a Mini ASTM Board.
Figure 8:
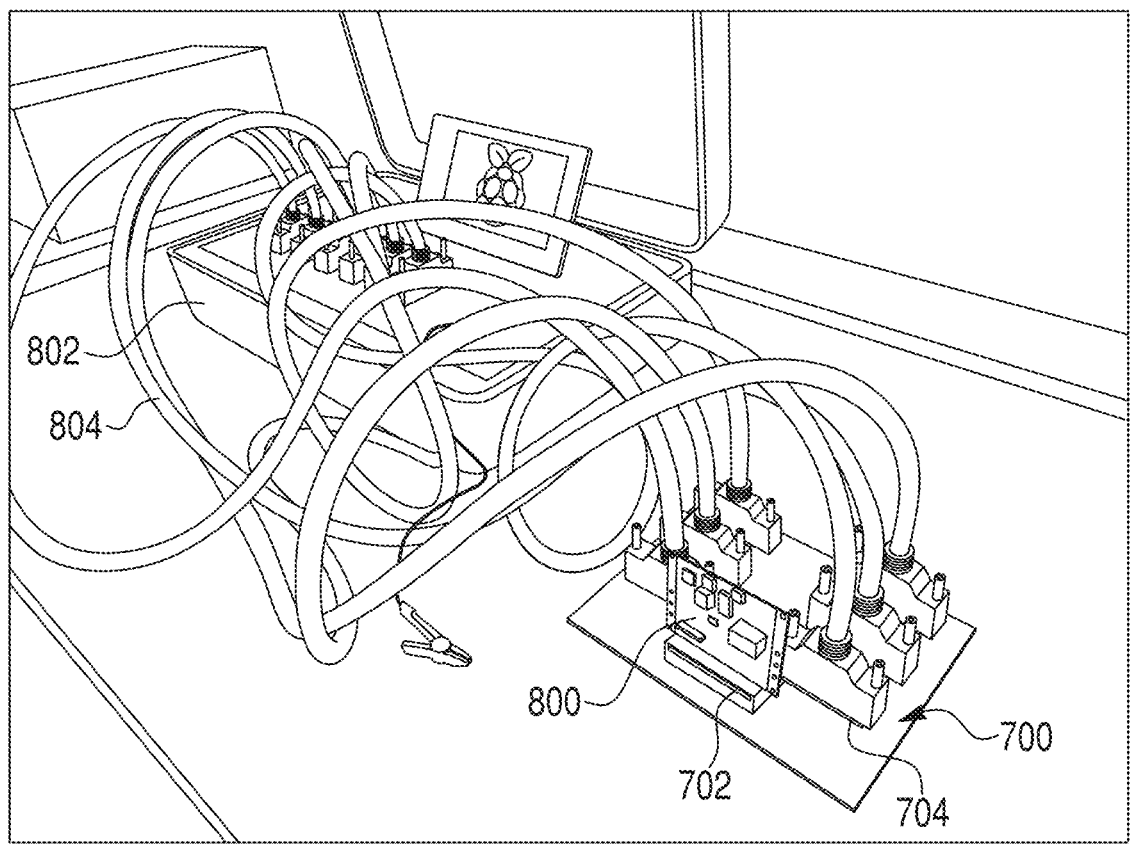
FIG. 8 is a picture showing the Mini ASTM Board connecting an ASTM machine to a SpaceCube v3.0 Mini Processor Card.

Referring to FIGS. 7-8, the Mini ASTM Board 700 provides a way to connect the SpaceCube v3.0 Mini Processor Card (or Mini) 800 to the Automated Safe-To-Mate (ASTM) Machine 802 for electrical testing of the Mini. The ASTM provides an automated way of doing basic electrical continuity and isolation checks between nets on a PCB. Referring to FIG. 7, the Mini ASTM Board 700 includes a printed circuit board (PCB) 701, a first connector 702, preferably a 400-pin SAMTEC SEARAY connector (SEARAY is the style of high speed, high density connector made by SAMTEC), into which the Mini 800 is received. Connections from this connector are routed in the PCB as copper traces to a plurality of second connectors 704, preferably six 78-pin High Density D-Subminiature (D-Sub) connectors, on the PCB. The first connector 702 and the second connectors 704 are mounted to the PCB 701, as best shown in FIG. 7.

The second connectors 704 are interfaced to the ASTM Machine 802 via commercially available Male 78-pin High Density D-Sub to Male 78-pin High Density D-Sub cables 804. The 78-pin D-Sub connectors on the Mini ASTM board 700 is preferred due to their availability on the ASTM machine. There are no active components on the Mini ASTM board 700. All ground and power nets on the Mini are separated in the Mini ASTM Board 700 (instead of being routed as power and ground planes in the PCB) so that a single lifted power or ground pin on a connector will be detected by the ASTM machine.

Referring to FIG. 7, the Mini ASTM Board 700 also features a set of mounting holes 706 that can be used to add standoffs for the board or to mount it in a frame. In addition, it includes a set of four holes 708 for attaching a pair of brackets to support the Mini 800 when it is installed onto the Mini ASTM board 700. The Mini 800 can be designed to use either wedge-loks or wedge-tainers for the card rails, and the brackets can be designed to support either option.

FIG. 8 shows the connection Mini ASTM board 700 being used to connect the Mini 800 to the ASTM machine 802. The Mini 800 is connected to the first connector 702. The ASTM machine 802 is interfaced with the Mini ASTM board 700 via cables 804 connected to the second connectors 704.

III. FMC+ ASTM Board

Electrical Interface Continuity/Isolation Testing (EICIT Testing) is a vital part of verifying any new piece of hardware. This testing is typically performed on a PCB before it is powered, and ensures that there were no issues with the manufacture or assembly of the board. The scope of this testing is to take resistance measurements between each pair of external pins on the board and ensure that nets that are supposed to be connected have the correct resistance, and that nets that are not supposed to be connected are properly isolated. Conducting these tests by hand with a digital multimeter is common for small PCB designs, but for complex, high-density boards, it quickly becomes unfeasible. The FPGA Mezzanine Card Plus (FMC+) VITA 57.4 Industry Standard defines boards of such complexity that feature a 560-pin connector that would allow the FMC+ to plug into a carrier card. The FMC VITA 57.1 version of the standard uses a 400-pin connector. Testing every possible combination of pins on an FMC (FPGA Mezzanine Card) or FMC+ card by hand would take months. The Automated Safe-to-Mate (ASTM) Machine developed at NASA GSFC, however, can make multiple checks per second, and does not need to be supervised while running, so engineers can "set it and forget it" for a few hours and come back later to review the results. The SpaceCube v3.0 FMC+ ASTM Board (FMC+ ASTM Board) provides a compatible interface between boards designed per the FMC or FMC+ standard and the ASTM machine to enable this testing. Since FMC cards (having 400-pin connector) can plug into FMC+ card slots, the SpaceCube v3.0 FMC+ ASTM board supports boards designed per the FMC+ or FMC standard. In the case of an FMC card, just 400 of the 560 traces between the connector and the 78 D-Subs on the ASTM Card will actually be used during testing.

Figure 9:
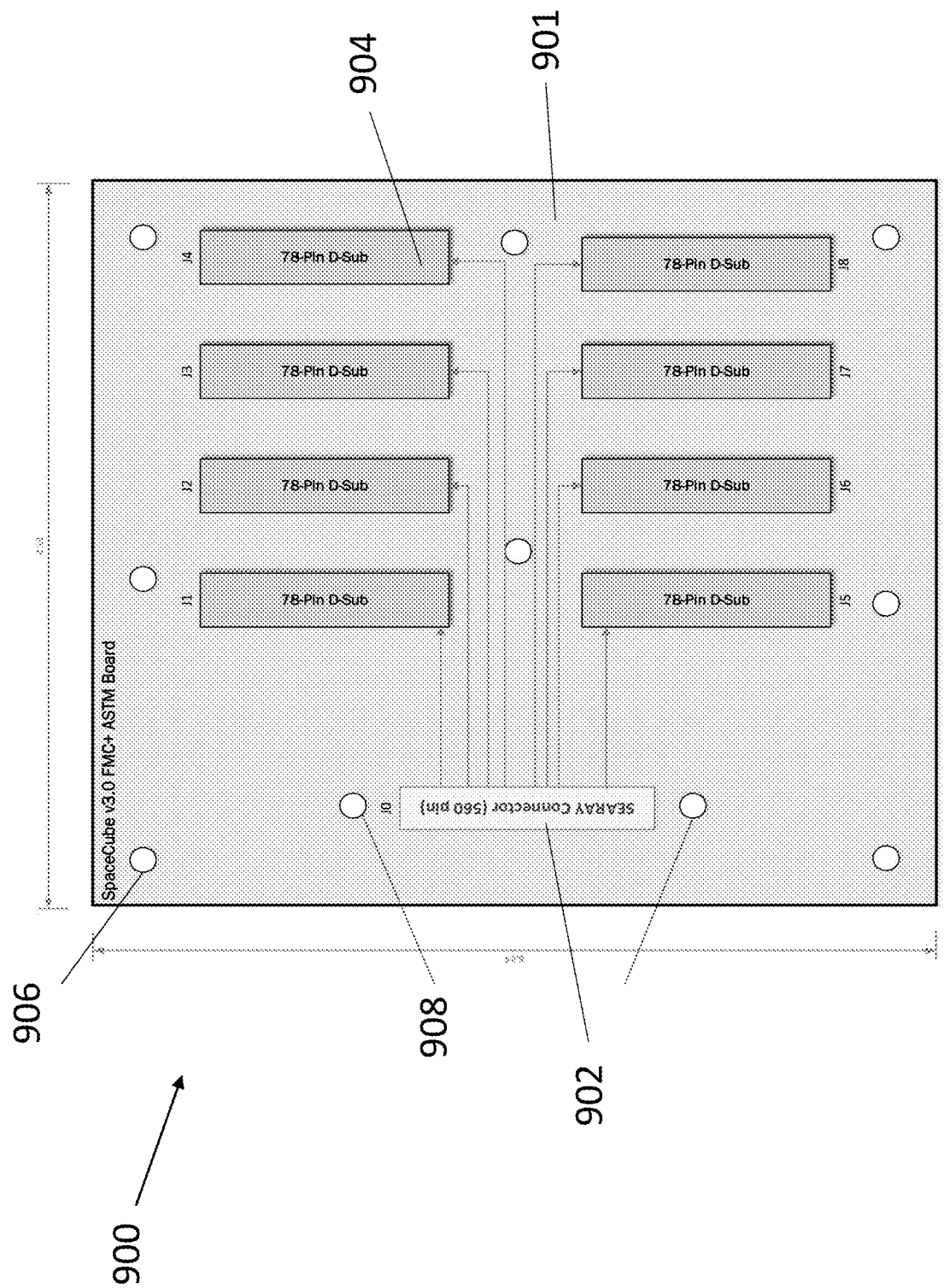
FIG. 9 is a block diagram showing the design of a FMC+ ASTM Board.
Figure 10:
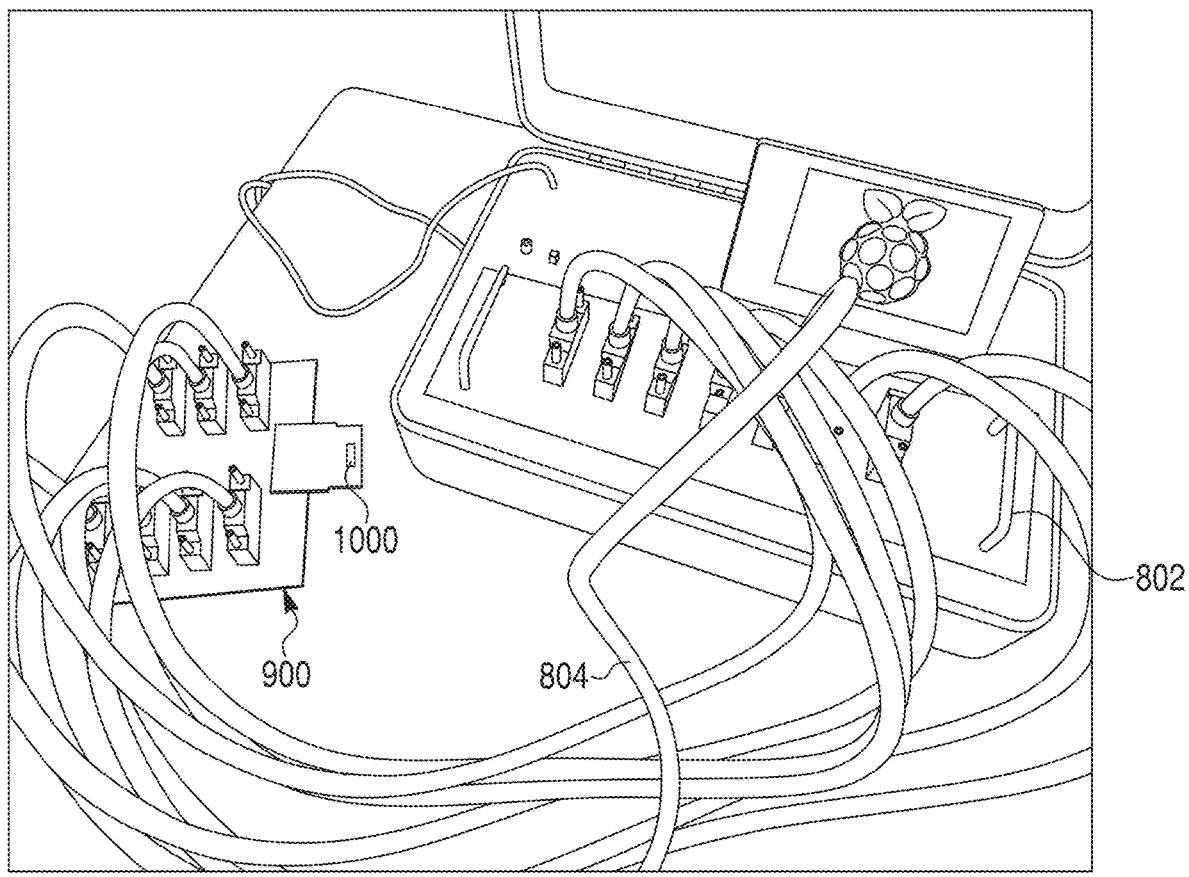
FIG. 10 is a picture showing the FMC+ ASTM Board connecting an ASTM machine to a FMC+ Card.

Referring to FIGS. 9-10, an FMC+ ASTM Board 900 provides a way to connect an FMC or FMC+ card 1000 to the ASTM machine 802 for electrical testing of the FMC or FMC+ card 1000. The ASTM machine 802 provides an automated way of doing basic electrical continuity and isolation checks between nets on the FMC or FMC+ card 1000. The FMC+ ASTM Board 900 includes a printed circuit board (PCB) 901, a first connector 902, preferably a 560-pin SAMTEC SEARAY connector, into which the FMC or FMC+ card 1000 is received.

Connections from this connector are routed in the PCB as copper traces to a plurality of second connectors 904, preferably eight (8) 78-pin D-Subminiature (D-Sub) connectors, which are configured to interface to the ASTM machine 802 via commercially available Male 78-pin High Density D-Sub to Male 78-pin High Density D-Sub cabling. The 78-pin D-Sub connectors on the FMC+ ASTM Board 900 is preferred due to their availability on the ASTM machine to allow simple commercial cables to be used. There are no active components on the board 900. All ground and power nets on the card 1000 are separated in the ASTM Board 900 (instead of being routed as power and ground planes in the PCB) so that a single lifted power or ground pin on a connector will be detected by the ASTM machine 802.

The FMC+ ASTM Board 900 is compatible with and can be used to test a SpaceCube v3.0 FMC Mezzanine Test Card (described below). In addition, by using a commercial FMC+ to FMC+ adapter cable for connecting two boards with FMC+ carrier side connectors together in a pin to pin direct connection and is available commercially, the FMC+ ASTM Board 900 can also be used to run an EICIT test of the FMC+ carrier interface on the SpaceCube v3.0 VPX processor card.

Referring to FIG. 9, the FMC+ ASTM Board 900 also features a set of mounting holes 906 that can be used to add standoffs for the board or to mount it in a frame. In addition, it also includes a pair of holes 908 flanking the first connector 902 which correspond to the FMC or FMC+ card standoffs defined by the VITA standards.

FIG. 10 shows the connection FMC+ ASTM Board 900 being used to connect a FMC+ card 1000 to the ASTM machine 802. The FMC+ card 1000 is connected to the first connector 902. The ASTM machine 802 is connected to the Mini FMC+ Board 900 via cables 804 connected to the second connectors 904.

IV. Mini Evaluation Board

A Mini Evaluation Board (MEB) 1100 is intended to serve as a stepping-stone for developers between a commercial development board and a custom-built FlatSat. This allows missions that are interested in using a SpaceCube v3.0 Mini Processor to begin developing and testing their software using a real Mini Processor Card, without having to wait for the process of designing and building a custom backplane, power supply, and mechanical enclosure. The Mini Evaluation Board supplies all necessary power to the Mini Processor card and breaks out several common development interfaces. The FlatSat is a high fidelity electrical and functional representation of a spacecraft bus that can be used as a test bed for Integration & Test (I & T), flight software, and flight operations.

The MEB 1100 is configured to connect to a SpaceCube v3.0 Mini Processor Card (Mini) via a 400-pin backplane connector, supply power to the Mini, monitor on-board current, provides JTAG (Joint Test Action Group) connectivity for both Mini Processor FPGAs over standard JTAG headers, allow for SelectMAP programming of Kintex FPGA, break out many common debug and development interfaces, break out a large number of I/O to an FMC+ connector, allowing the Mini Processor Card to connect to various COTS and custom Mezzanine cards.

Figure 11:
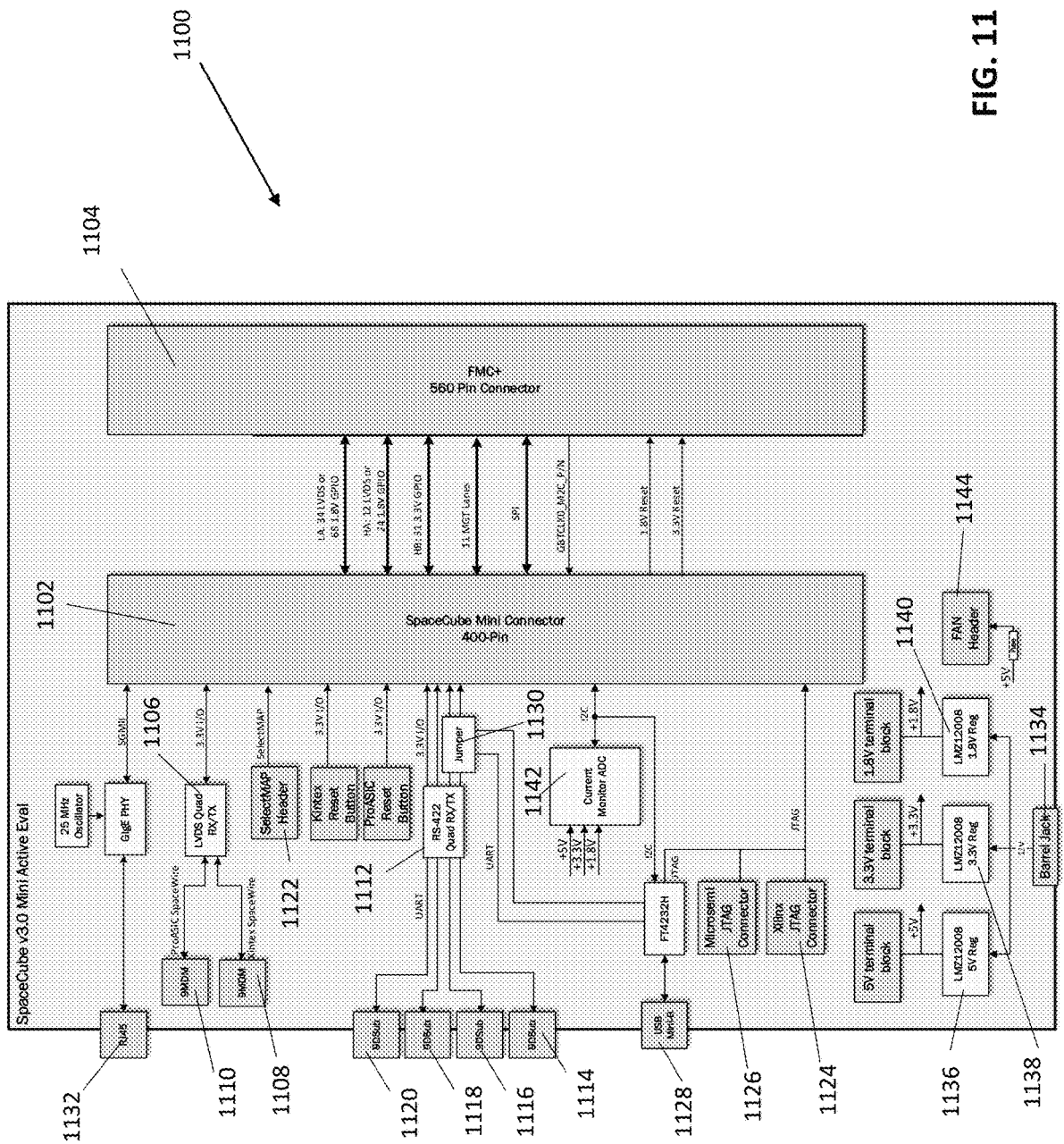
FIG. 11 is a block diagram showing the design of an MEB (Mini Evaluation Board)

Referring to FIG. 11, the MEB 1100 includes a Mini connector 1102, preferably a 400-pin backplane connector, into which the Mini Processor Card is received.

The MEB 1100 also includes an FMC+ connector 1104 in electrical communication with the Mini connector 1102. FMC+ connector is configured to receive a COTS card or a custom Mezzanine card therein and to provide interfaces from the Mini to the COTS or custom Mezzanine card.

The MEB 1100 also includes a first transceiver 1106 which support a plurality, preferably two (2), SpaceWire ports 1108 and 1110 to the Mini connector 1102. One of the SpaceWire Port 1108, SPW0, is connected to the Kintex FPGA of the Mini 800. Both ports preferably have 10052 differential termination on the RX side and are compatible with standard SpaceWire cables.

The MEB 1100 also includes a second transceiver 1112 which support a plurality, preferably four (4), of RS-422 ports 1114, 1116, 1118, 1120 to the Mini connector 1102.

Figure 12:
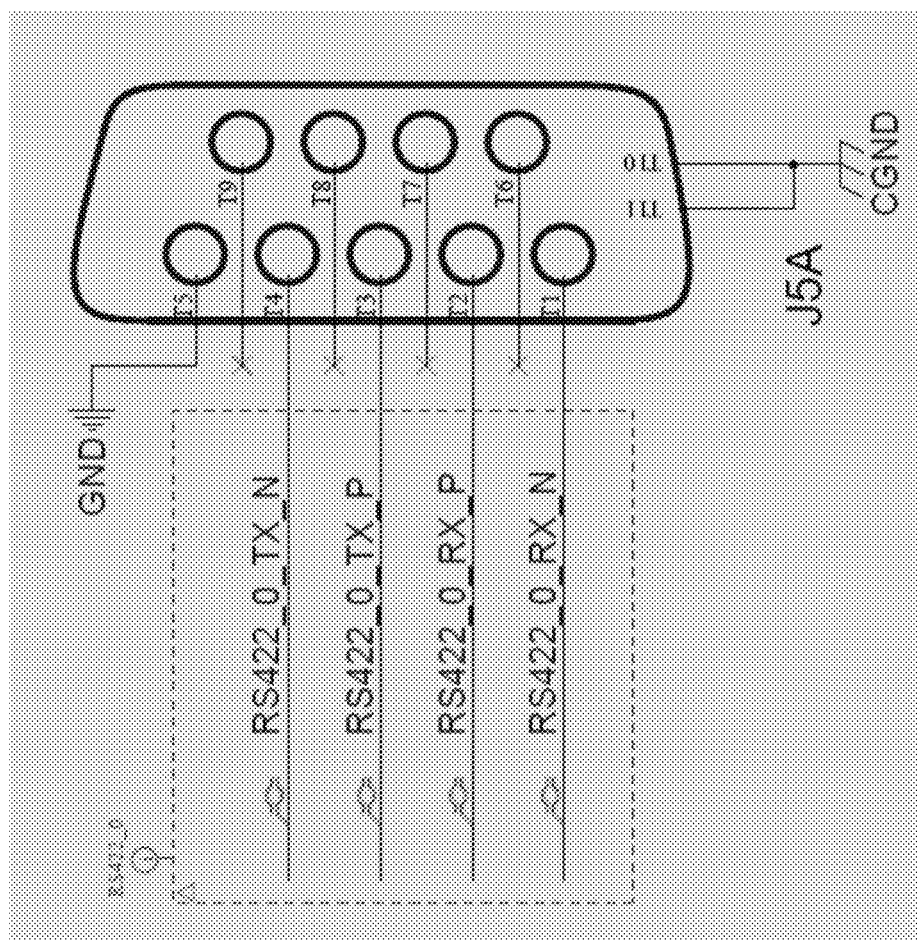
FIG. 12 is a diagram showing the pinout of a RS-422 port.

Three of the RS-422 ports (RS422_0, RS422_1, RS422_2) 1114, 1116, 1118 are preferably configured to connect to the Kintex; and the remaining RS-422 port (RS422_3) 1120 is preferably configured to connect to the RHM. All four ports 1114, 1116, 1118, 1120 preferably have 100Ω differential termination on the RX side and are brought out to 9-pin DSUB connector. All four ports 1114, 1116, 1118, 1120 have the identical pinout as shown in FIG. 12, wherein TX means transmit, RX-receive, GND-ground and CGND-chassis ground.

Figure 13:
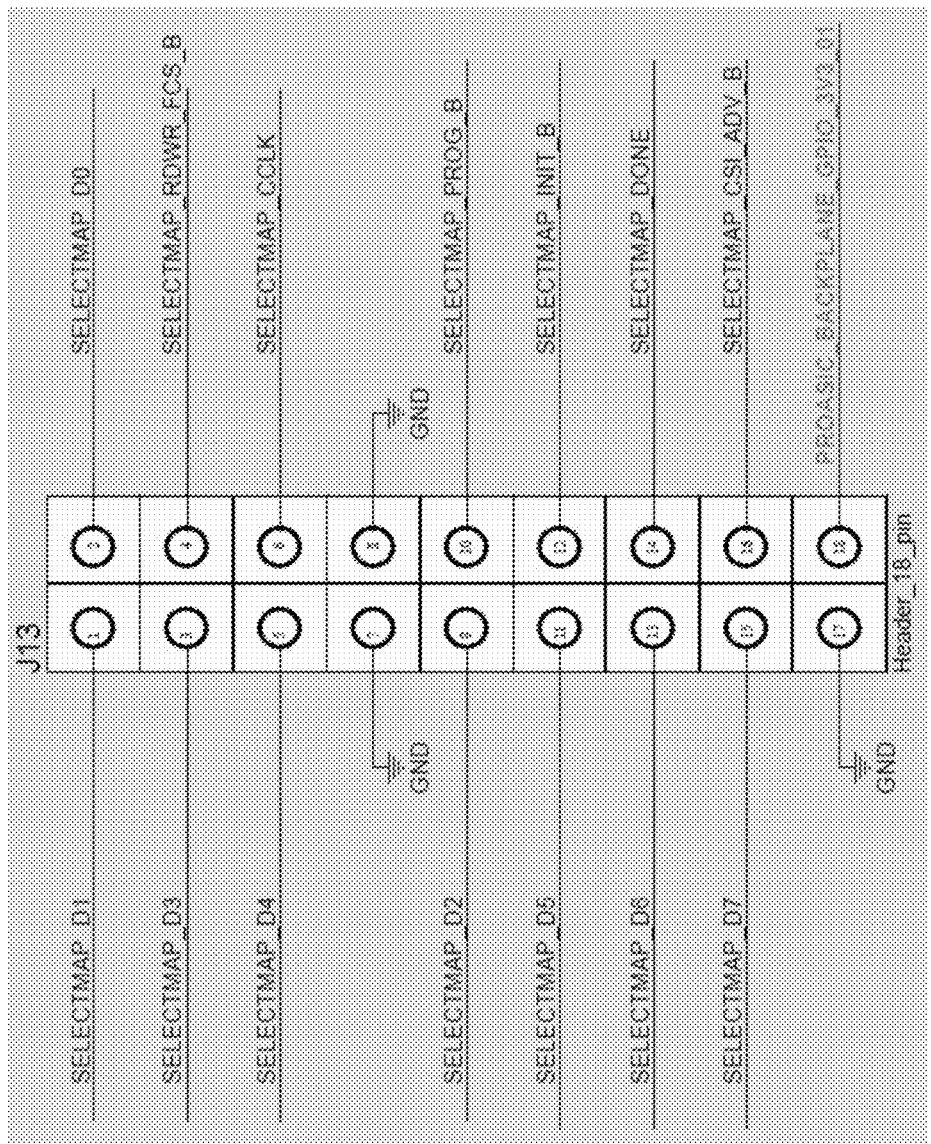
FIG. 13 is a diagram showing the pinout of a SelectMAP pin header.

The MEB 1100 also includes a pin header 1122 to support external programming of the Kintex FPGA 104 over the SelectMAP interface. This can be harnessed out (i.e., electrically connected via a wiring harness) to another development board (anything with an FPGA and enough resources to run the programming IP: KCU105, ZCU102, ZCU106, ULTRAZED, etc.; not limited to Xilinx devices or commercial development boards) to allow for programming the Kintex FPGA from another device, instead of over JTAG (see below). This is provided for situations where the design would require the Kintex FPGA 104 to be programmed in-situ by another device in the system, instead of from the on-board ProASIC FPGA 200. The pinout for the SelectMAP pin header 1122 is shown in FIG. 13.

Both FPGAs (Kintex and RTProASIC FPGAs) on the Mini 800 share a common JTAG chain, but must be programmed separately. Standard Xilinx and Microsemi JTAG programming connectors 1124 and 1126, respectively, are provided on the MEB, which are compatible with the Xilinx Platform II cable (Xilinx JTAG programming connector 1124) and the Microsemi FlashPro4 programmers (Microsemi JTAG programming connector 1126). It is important, however, that both JTAG programming connectors 1124 and 1126 should not be connected to their respective programmers at the same time. If both programmers are connected to the MEB 1100 at the same time, an incorrect boundary scan may result.

Figure 14:
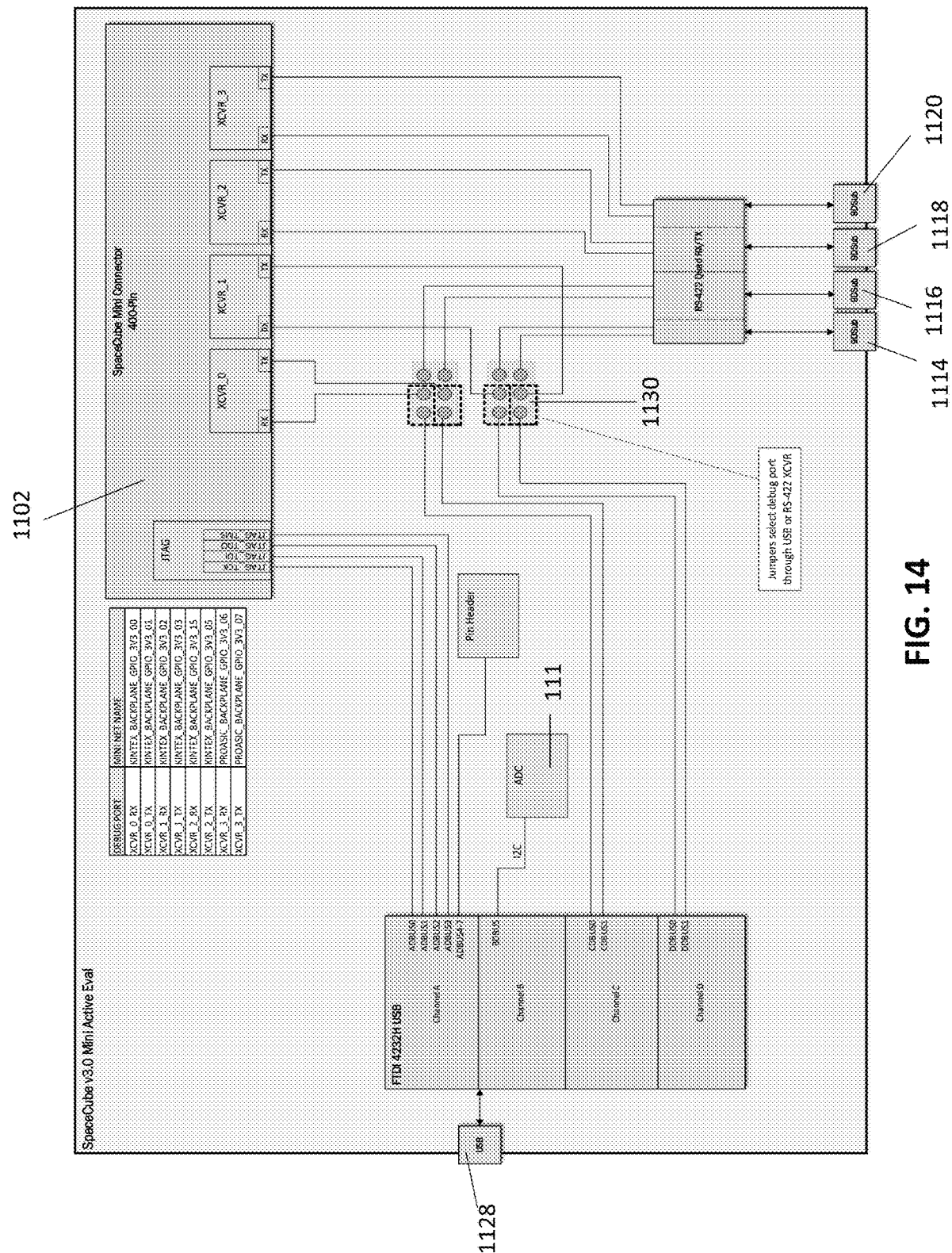
FIG. 14 is a block diagram showing the electrical connectivity of a USB interface on the MEB.

Referring to FIGS. 11 and 14, the MEB 1100 also includes a USB interface 1128, preferably USB 2.0, is provided for Universal Asynchronous Receiver/Transmitter (UART) over USB functionality. The USB device is configured on board power-on by an EEPROM (Electrically Erasable Programmable Read-Only Memory), and can replace one or more RS-422 ports. For example, the USB 2.0 interface 1128 can be used to replace RS-422 ports 1114 and 1116 by a jumper 1130 as shown in FIG. 14. The USB interface 1128 may be used to control several GPIO (General-Purpose Input/Output) ports 1129 and read out the on-board current monitoring ADC 1142 over I2C communication protocol. In FIG. 14 TX depicts a transmitter, RX—receiver, and XCVR—transceiver.

Figure 15:
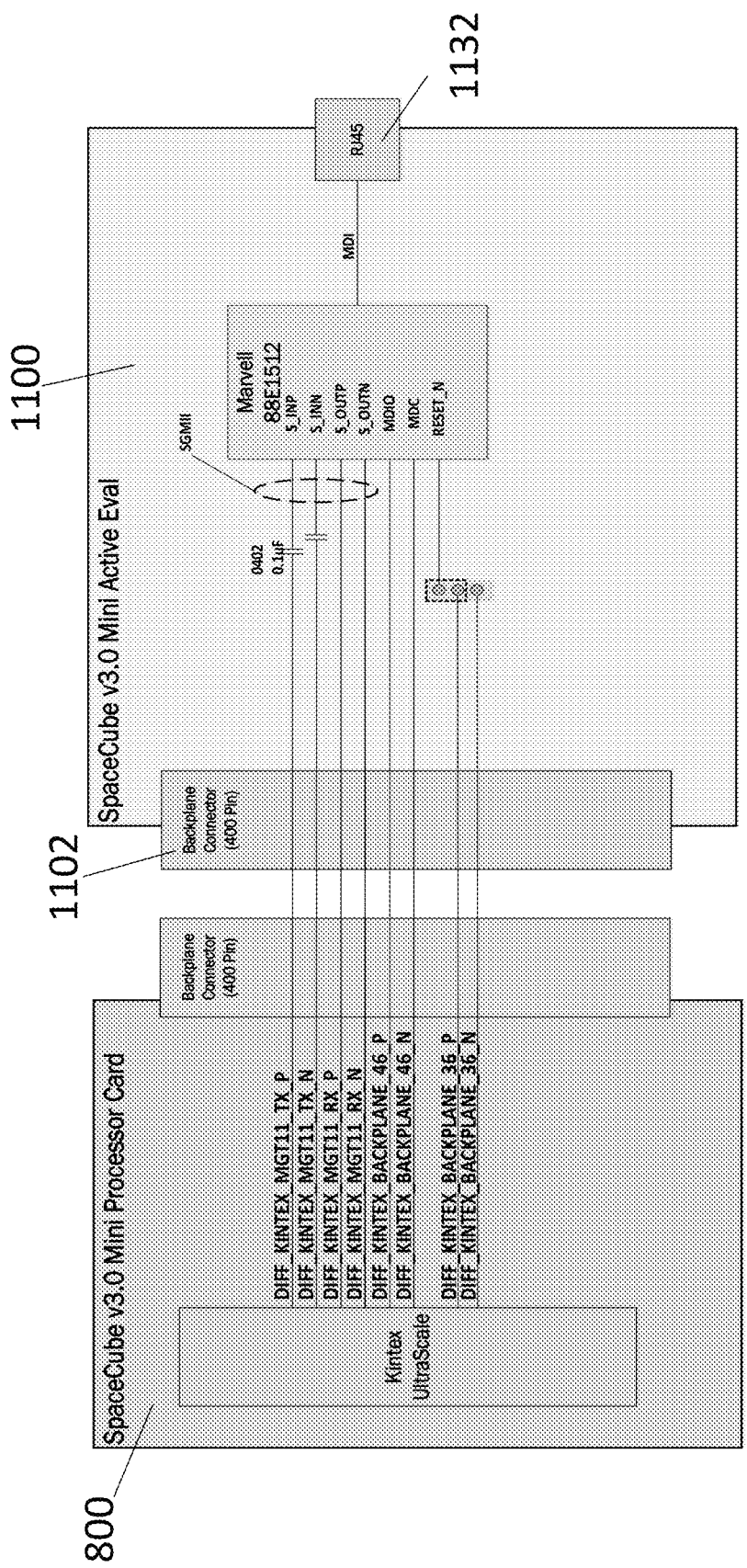
FIG. 15 is a block diagram showing the electrical connectivity of an Ethernet port on the MEB.

Referring to FIGS. 11 and 15, the MEB 1100 also includes an Ethernet port 1132, preferably a Gigabit Ethernet port, for large file transfer to the Mini 800. The Ethernet port 1132 is electrically connected to the Mini connector 1102. FIG. 15 shows the electrical connection between the Mini 800 when it is inserted into the Mini connector 1102 on the MEB 1100.

Figure 16:
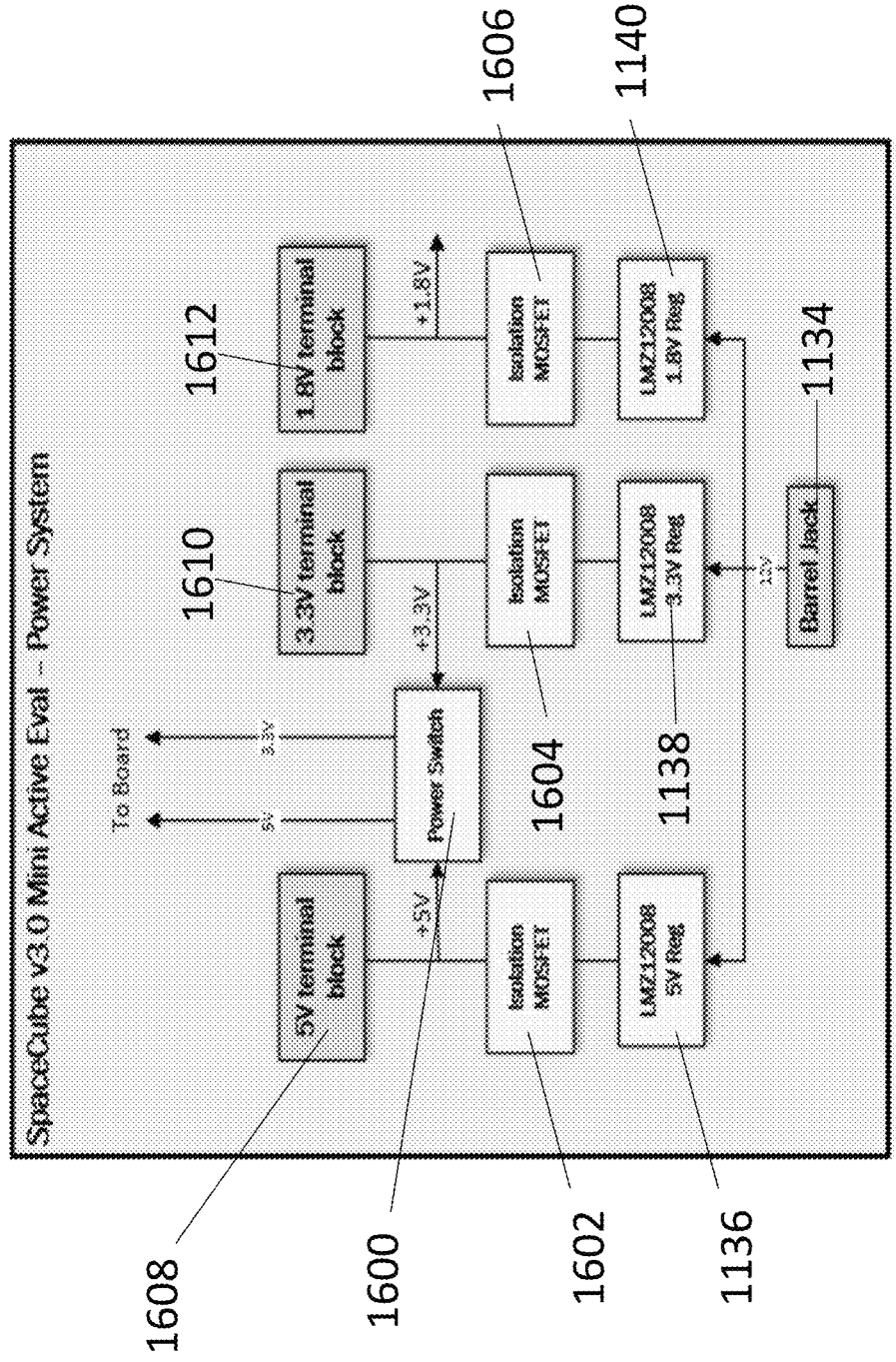
FIG. 16 is a block diagram showing the details of the power distribution on the MEB.

Referring to FIGS. 11 and 16, the MEB 1100 can be powered either from a single 12V barrel jack 1134 or from individual bench supply terminal blocks 1608, 1610, 1612. The bench supply option is provided to allow developers to use calibrated, monitored supplies in order to gain more detailed insight into the power requirements for a given design. For typical development work where that extra detail is not required, a 12V adaptor, connected to the barrel jack 1134, provides a cheap, simple alternative power source, which reduces the necessary lab equipment.

Referring to FIG. 16, if the 12V supply is used via the barrel jack 1134, regulators 1136, 1138, and 1140 on the MEB 1100 convert it down to supply 5V, 3.3V and 1.8V to the MEV 1100, respectively. If individual bench supplies are used, 5V and 3.3V are required. The 1.8V supply is only necessary if using an FMC Mezzanine (disclosed below) card that requires it.

A power switch 1600 is also provided on the MEB 1100 that ensures that power is not supplied to the Mini 800, when it is plugged into the MEB 1100 via the Mini connector 1102, unless both 5V and 3.3V are present and within acceptable range. Isolation MOSFETS 1602, 1604, 1606 are present between the on-board regulators 1136, 1138, 1140 and the bench supply terminal blocks 1608, 1610, 1612 to ensure that the bench supply will not back-drive the regulators. The power system also supplies 1.8V, 3.3V, and 12V to the FMC+ connector per the VITA 57.4 standard.

Figure 17:
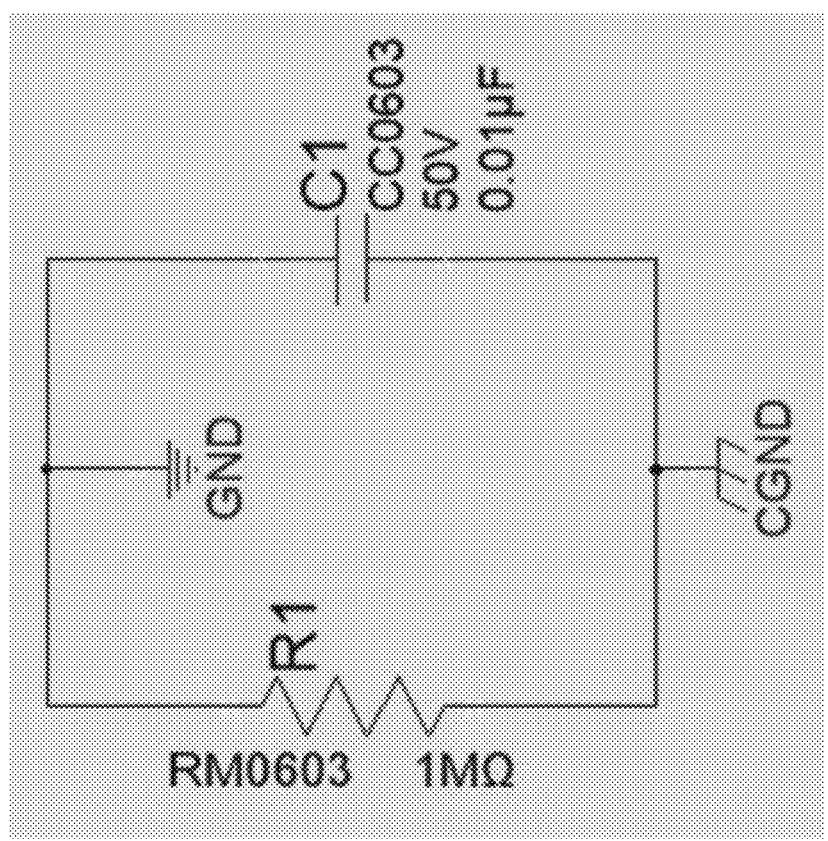
FIG. 17 is a circuit diagram showing a GND-CGND jumper configuration.

The MEB 1100 includes the following ground nets: Digital Ground (GND) and Chassis Ground (CGND). GND is shared between the MEB 1100, the Mini 800 (when it is plugged into the MEB 1100), and the FMC+ Mezzanine Card (when present). The GND and CGND can be isolated from each other or jumpered together for a single point ground connection. A jumper circuit is shown in FIG. 17. R1, R2, R3, R4 and C1, C2, C3, C4 are installed for a single point ground. Leave these uninstalled to leave digital ground isolated from chassis ground (CGND). Specifically, FIG. 17 shows one instance of a circuit that is copied four times on the MEB. All four copies are identical, just with different numbering. If these are present, then GND and CGND are shorted together. If they are not, then GND and CGND are electrically isolated from one another. Different systems require one or the other depending on their grounding scheme.

The MEB 1100 further includes an on-board current monitoring ADC 1142 (FIG. 11) which reads out current for each of the low voltage supplies. The current monitoring ADC 1142 is connected to the Mini connector 1102 (and thereby the Mini 800 when it is connected to the Mini connector 1102) through an I2C interface. Preferably, the specifications for the current monitoring ADC 1142 are as follows:

ADC Part #TI-INA3221 (3-channel, 13-bit)
I2C Address: 0100_0000
CH1: 5.0V
CH2: 3.3V
CH3: 1.8V Each current is monitored through a 20 mΩ sense resistor.

Each power supply on the MEB 1100 has an LED which indicates the rail is powered. In addition, there are status indication LEDs for the SELECTMAP_DONE and SELECTMAP_PROG_B signals, which indicate if the Kintex FPGA has been programmed.

Referring to FIG. 11, the MEB 110 also includes a pin header 1144, preferably a fused (500 mA) 5V pin header, for an optional fan. Typically, for flight, the heat path for a Mini 800 (when plugged into the Mini connector 1102) would be through the mounting rails to an enclosure. This heat path is not present in an Active Evaluation Kit since the Mini 800 is free-standing. As such, a fan may be necessary for high-power applications when developing in a lab environment. Any standard 5V-compatible computer case fan or CPU fan with a 0.1" two-pin header connection can be used with the MEB 1100.

V. Mezzanine Test Card

Figure 18:
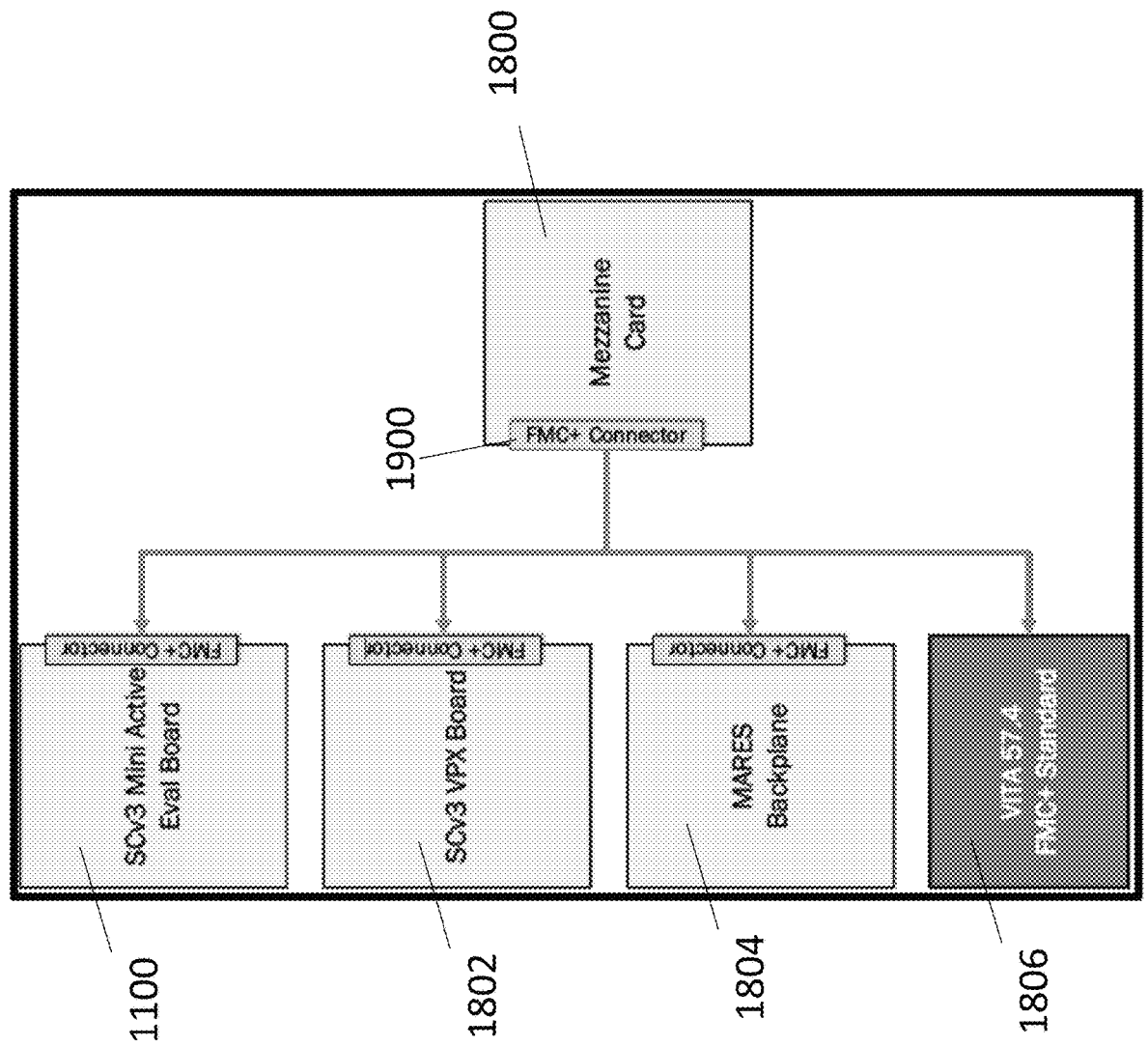
FIG. 18 is a block diagram showing the compatibility of the MEZZ for different types of cards.

The SpaceCube v3.0 Mezzanine Test Card (MEZZ) 1800 is a multi-use GSE (Ground Support Equipment) test board that is compatible with several different development platforms in the SpaceCube v3.0 ecosystem. FIG. 18 shows the compatibility of the MEZZ 1800. It can be used as an optional extension to the MEB 1100, as a development interface to the SpaceCube3 VPX board 1802, or as an extension of a MARES test backplane connector 1804. It is compatible with the VITA 57.4 standard, allowing it to potentially be connected to various commercial FMC+ carrier cards 1806. It breaks out a large number of General Purpose Input/Output (GPIO) to various common development interfaces.

Figure 19:
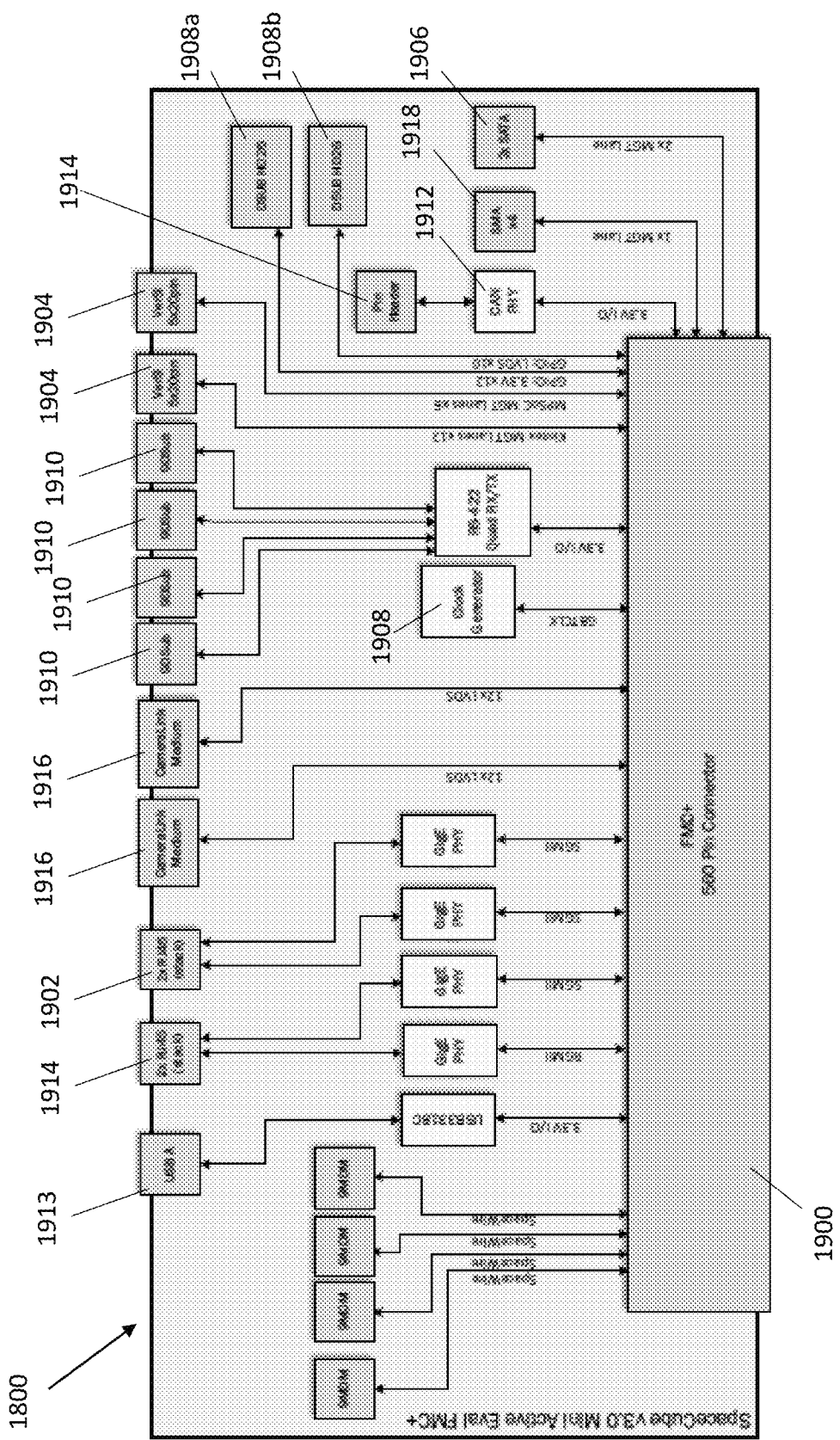
FIG. 19 is a block diagram showing the design of a MEZZ.

Referring to FIG. 19, the MEZZ 1800 includes a connector 1900, preferably an FMC+ 560 pin connector, for plugging into a carrier card. As noted above, the card may be a MEB 1100, a SpaceCube3 VPX board 1802, a MARES test backplane connector 1804, or any FMC+ card 1806.

A plurality of high-speed interfaces are electrically connected to the connector 1900. Referring to FIG. 19, a total of twenty-four (24) MGT SERDES lanes are broken out from the FMC+ connector to different interfaces. Each lane consists of a TX/RX pair, and is designed for speeds up to 12.5 Gbps. The MEZZ 1900 supports AC coupling schemes compatible with SRIO, PCIe, and SpaceFiber through selective population of capacitors present at TX and RX sides of each lane. Interfaces available on the board are:

Ethernet port 1902: Three separate Gigabit interfaces are available over SGMII to the Ethernet ports 1902, preferably standard RJ45 connectors. The MDIO/MDC interface is shared between ETH0 and ETH1, which have different physical addresses.

VERSI Connector 1904: A total of 18 lanes are brought directly out to a VERSI connector 1904, preferably a high-speed Airborn VerSI connector. These can be wired out to a custom harness to communicate with other development boards or directly with various cameras, instruments, and sensors. As shown in FIG. 19, the MEZZ 1800 preferably includes two identical VERSI connectors with identical functions.

SMA (SubMiniature version A) connector 1918: One lane is connected to four SMA connectors 1918 (TX_P, TX_N, RX_P, RX_N). This can easily be connected in a loopback configuration to facilitate quick testing of a single lane, or to connect to an instrument using standard, commercially available SMA cables.

SATA (or Serial Advanced Technology Attachment) connector 1906: Two lanes are brought out to SATA connectors 1906, which can serve as a common interface for large storage media.

Clock Generator 1908: An on-board clock generator provides a configurable reference clock back to the carrier card, such as 1100, 1802, 1804, and anything compatible with 1806, via the FMC+ connector. Clock type and frequency are set by configuring DIP switches on the MEZZ 1800.

A total of 42 LVDS pairs and 52 single-ended 3.3V GPIO are routed out from the connector 1900 to various interfaces on the MEZZ 1900. They are allocated as follows:

GPIO (general-purpose input/output) connector: A 15-pin DSUB connector hosts two LVDS pairs connector 1908a and four 3.3V single-ended GPIO connector 1908b.

RS-422 port 1910: The board hosts transceivers for four RS-422 ports 1910. A total of eight 3.3V GPIO are used from the FMC+ connector 1900. The RS-422 ports are routed out individually preferably to 9-pin DSUB connectors. These are commonly used as debug UART interfaces.

CAN interface: A CAN interface is provided to a pin header 1914, which is terminated with 120Ω per the CAN bus standard. The on-board CAN PHY 1912 also supports a loopback feature (enabled by a DIP switch) that enables testing without connecting to a full CAN bus.

USB port 1913: the USB port 1913, preferably a USB2.0 port, is included which provides the capability to connect to a flash drive (i.e., an external memory device 0 for quick, easy file transfer to the system being tested.

Ethernet 1914: One RGMII Gigabit Ethernet interface (ETH_3) is provided. It shares an MDIO/MDC interface with ETH_2 (SGMII, see above).

CameraLink interface 1916: Two CameraLink interfaces 1916 are supported on the board. Each interface 1916 can be used as either CameraLink Base or CameraLink Medium. Shield terminations are connected to GND through a 0Ω resistor. Power over CameraLink is not supported. Unused pairs (including CC pins) are terminated to 10002.

PMOD (Peripheral Module): Three PMOD connectors are present for a total of 24 single-ended 3.3V GPIO. 16 of these are 1.8V GPIO from the connector 1900 that are level-shifted up to 3.3V, and 8 are 3.3V GPIO from the connector 1900 itself. PMOD connectors provide a simple interface to a variety of COTS development boards.

Figure 20:
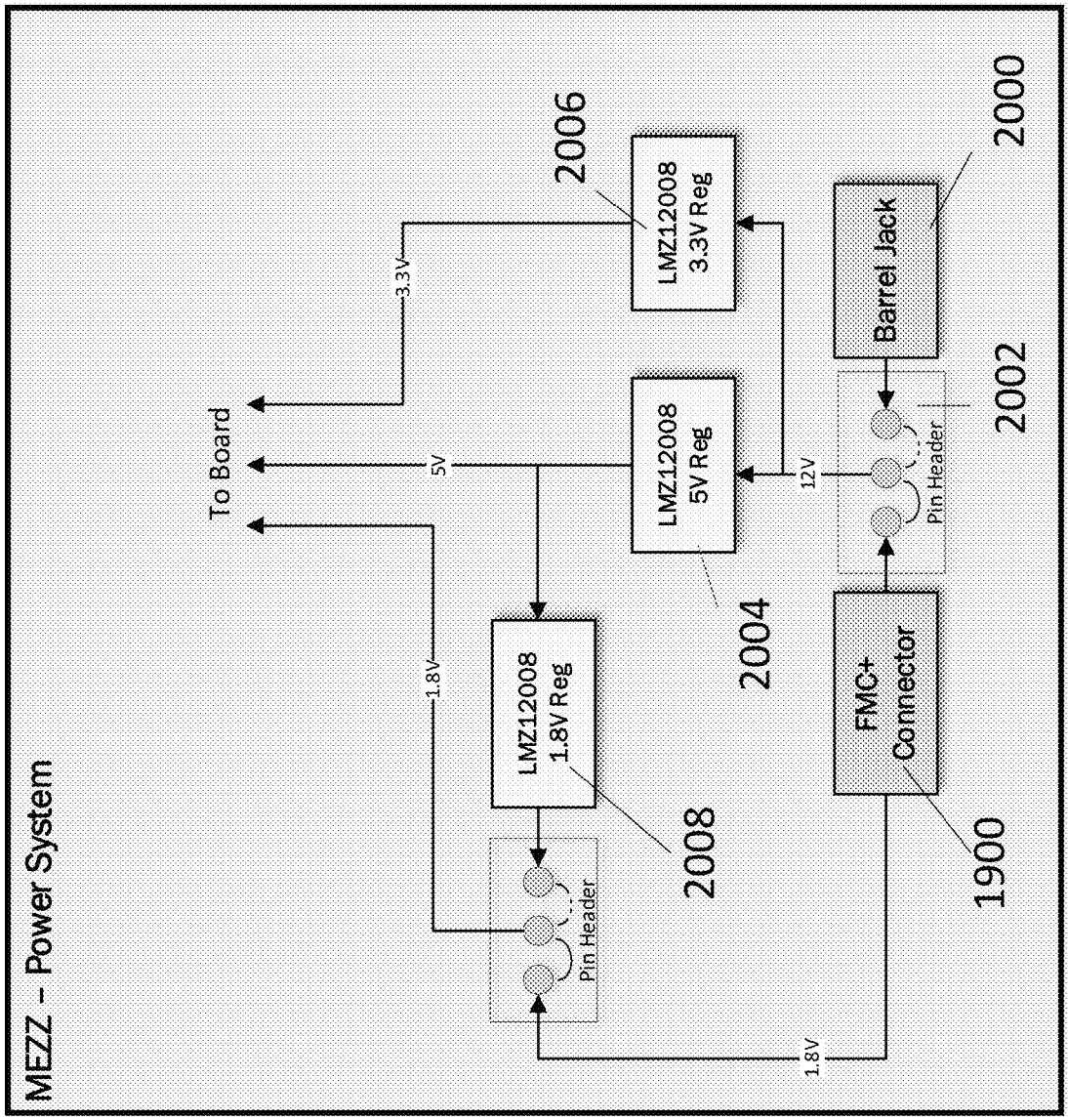
FIG. 20 is a block diagram showing the details of the power distribution on the MEZZ.

The power distribution for the MEZZ 1800 is designed with a large amount of flexibility to accommodate the many carrier cards that may be received by the connector 1900 on the MEZZ 1800. Referring to FIG. 20, the MEZZ 1800 requires 12V power supplied from either the connector 1900 or through a barrel jack 2000, selected through an on-board jumper 2002. 12V is converted to 5V and 3.3V by voltage regulators 2004, 2006, respectively, on the MEZZ 1800. 1.8V can be supplied either through the connector 1900 or by an on-board 5V-to-1.8V regulator 2008. The MEZZ. 1800 includes grounding nets identical to those described for the MEB 1100 above.

VI. Automated Functional Test Suite

After each SpaceCube board (or card) is manufactured and assembled, it must be tested to make sure that it has been built correctly before it can be delivered to end users and customers for application development or actual deployment in a space flight environment. The goal of testing is to identify defects due to manufacturing of the PCB, assembly of the parts on the board, or problems with the parts themselves. The first step in testing the SpaceCube board is to perform an Electrical Interface Continuity/Isolation Testing (EICIT Testing). This could be done manually or using the ASTM machine 802 and various ASTM adapter cards (such as the Mini ASTM and FMC+ ASTM boards) and/or other test cables. Once the SpaceCube board passes that testing, it needs to undergo powered and functional testing. An automated functional test suite 2100 of the present invention is configured to perform the functional testing of the SpaceCube v3.0 board (or another comparable board). Manual testing of hardware takes engineers significant time and effort, while automation of the process significantly reduces that time. Testing manually is also prone to bias, mistakes, and differences in technique between operators. Automated testing removes these issues and provides repeatability even when run by different users. Automated testing has the important benefit of verifying that the components are working appropriately after updates during the development and deployment cycles. Much of the software and FPGA IP cores used for testing the SpaceCube v3.0 The automated functional test suite 2100 of the present invention uses the same Mini Processor Card as for the SpaceCube v3.0 VPX board functional test suite. The only differences would be in quantities and some of the specific data rates the interfaces are operated at due to differences in performance capabilities.

Figure 21:
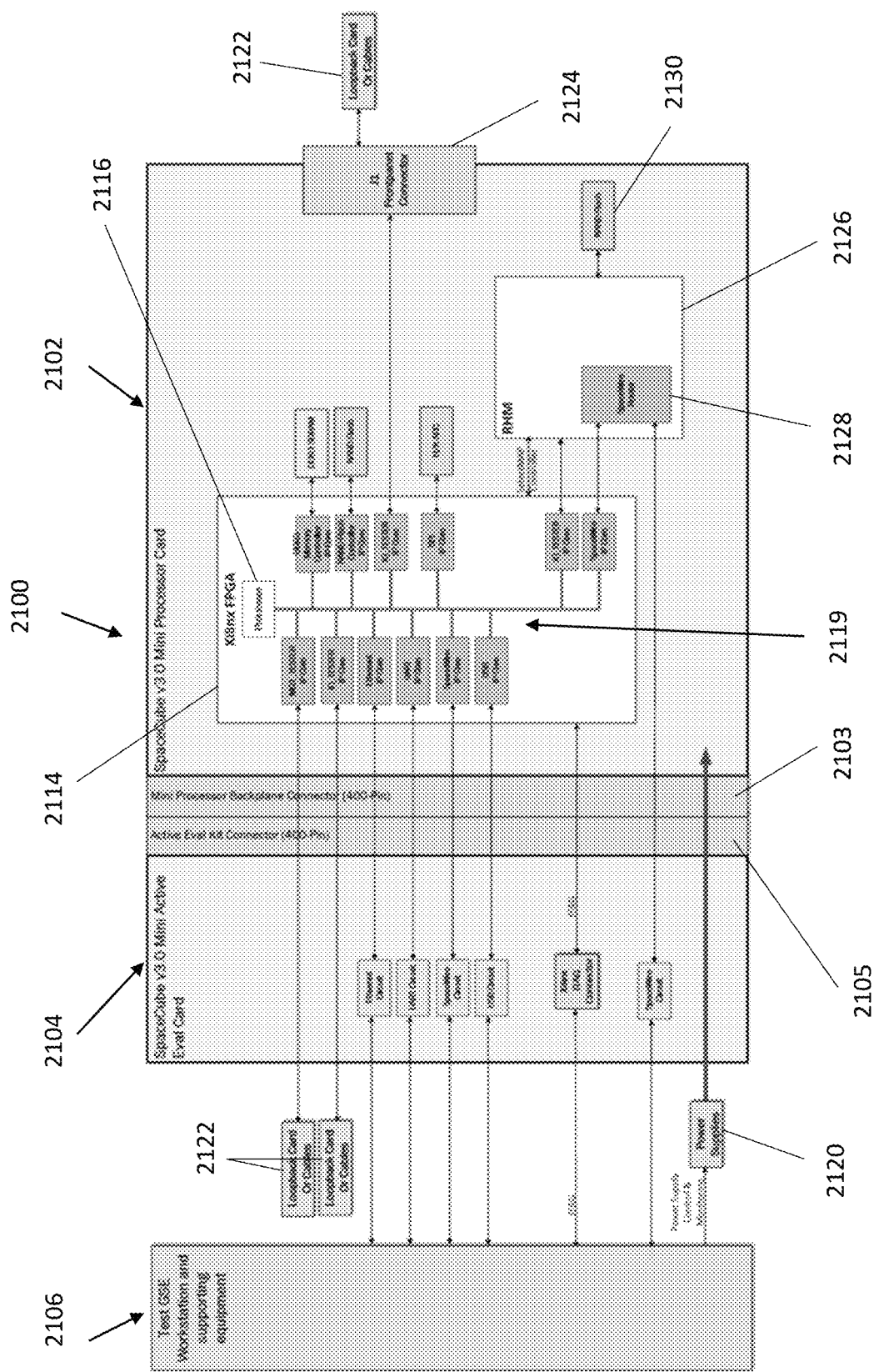
FIG. 21 is a block diagram showing a testbed configuration for testing the SpaceCube v3.0 Mini Processor.

The automated functional test suite 2100 of the present invention, as illustrated in FIG. 21, comprises a SpaceCube v3.0 Mini Active Evaluation Card 2104 provided for testing a SpaceCube v3.0 Mini Processor Card 2102. The SpaceCube v3.0 Mini Processor Card 2102 and the SpaceCube v3.0 Mini Active Eval Card 2104 are operatively coupled to one another through backplane connectors 2103 and 2105 of the Mini Processor Card 2102 and the Mini Active Evaluation Card 2104, respectively. Specifically, the SpaceCube v3.0 Mini Processor Card 2102 is provided with the Mini Processor backplane connector 2103, preferably a 400-pin backplane connector, while the SpaceCube v3.0 Mini Active Evaluation Card 2104 is provided with the Mini Evaluation backplane connector 2105, preferably a 400-pin backplane connector, as best shown in FIG. 21.

Figure 22:
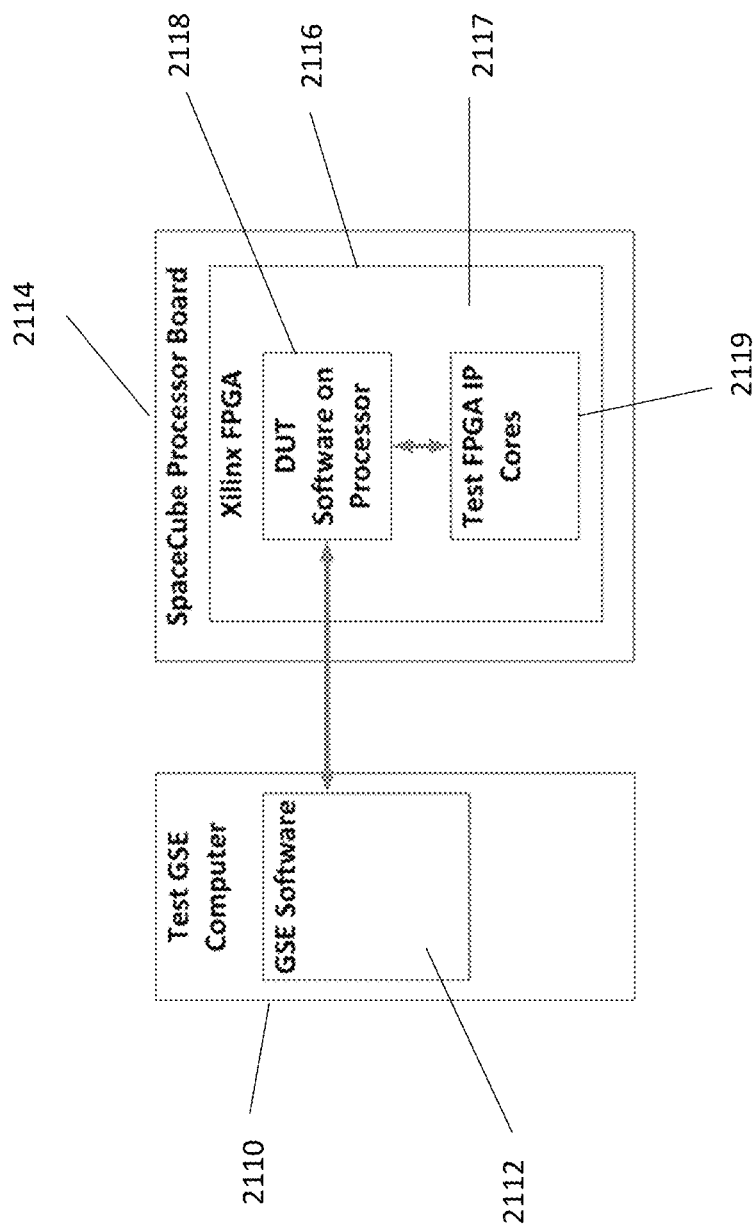
FIG. 22 is a block diagram showing a software component in a GSE test suite, a software, and FPGA IP components.

The automated functional test suite 2100 relies on a combination of software, custom FPGA IP cores, and a test ground support equipment (GSE) 2106. The test GSE 2106 is operatively connected to the Mini Processor Card 2102 and the Mini Active Evaluation Card 2104 of the automated functional test suite 2100 and can include a workstation computer for hosting a GSE software 2112 (as shown in FIG. 22), custom and commercial boards for breaking out different interfaces, custom or commercial cables, and power supplies. These are all set up in a Testbed configuration for testing the SpaceCube v3.0 Mini Processor Card 2102, as shown in FIG. 21.

Each functional test for the hardware has a software component in the GSE test suite as well as a software component called a Design Under Test (DUT) software 2118 as shown in FIG. 22. The GSE software 2112 runs on a workstation or computer 2110 and provides a user-friendly interface to test software. The DUT software 2118 runs in a field-programmable gate array (FPGA) 2116, such as the Xilinx FPGA, on a SpaceCube processor board 2114 under test. The DUT software 2118 can be hosted in a silicon processor or a soft processor built out of a Xilinx FPGA fabric 2117. This is the "Processor" 2116 identified in FIG. 21. The same concept could be scaled to run on multiple FPGAs. As in the case of the SpaceCube v3.0 VPX board which has two Xilinx FPGAs (the Kintex and the Zynq MPSoC) that would both need to run DUT software 2118.

Each test is specifically designed to check a certain functionality of the SpaceCube hardware. The DUT software 2118 exercises each interface on the SpaceCube processor board 2114, including I/O interfaces (Ethernet, SpaceWire, RS-422 UARTs, etc.), memories (non-volatile and volatile), FPGA configuration interfaces, Analog-to-Digital or Digital-to-Analog devices, and others. In order to do this, there are also various FPGA IP cores the DUT software 2118 controls to test these interfaces. FIGS. 21 and 22 shows FPGA IP cores 2119 in the Xilinx FPGA 2116 that are part of the Automated Functional Test Suite 2100 for the SpaceCube v3.0 Mini. Some of the FPGA IP cores 2119 that implement a standard I/O interface (such as UART, SPI, etc.) or memory controller interface (DDR3) may be provided by the FPGA vendor (Xilinx in the case of SpaceCube boards) or have been previously developed for mission use. Others are custom IP cores such as IO_TESTER that were developed specifically for the Automated Functional Test Suite 2100.

The GSE software 2112 is responsible for initializing the rest of the test equipment including turning on power supplies 2120, configuring the Xilinx FPGA 2116, and programming it with the DUT software 2118. In a typical test, the GSE software 2112 sends instructions and/or parameters to the DUT software 2118 and the DUT software 2118 communicates with the hardware according to the provided parameters. The DUT software 2118 gathers the hardware response and sends it back to the GSE software 2112. The GSE software 2112 receives, parses, and verifies the results returned by the DUT software 2118. The automated test suite 2100 allows this entire sequence to occur in an automated fashion. The test suite software also provides the flexibility to run tests individually or in groups. This allows longer test procedures to be executed efficiently, while still allowing targeted testing of individual interfaces that may need troubleshooting.

For testing certain I/O interfaces, such as SpaceWire or UART ports, the GSE software 2112 sends a deterministic test pattern to the DUT software 2118 over the interface under test and the DUT software 2118 echoes the same test pattern back. The GSE software 2112 then parses the returned data and look for errors. For testing other general-purpose, high-speed I/O lines, including Multi-Gigabit Transceiver lanes, the SpaceCube hosts an FPGA IP core 2119 (IO_Tester and MGT_Tester) that sends out PRBS (Pseudo-Random Binary Sequence) serial data on the I/O lines. External loopback boards or cables 2122 are used to connect the data back to the FPGA IP cores 2119. One of the external loopback boards or cables 2122 is operatively connected to the Mini Processor Card 2102 through a front panel connector 2124, as best shown in FIG. 21. Thus, the I/O lines are split into pairs where the IP core transmits data on one line and the loopback GSE electrically connects that line to the other in the pair to "loop" the data back to a receive pin on the IP core. The IP core can then verify whether there are errors in the data being returned over the loopback link by comparing it to the data the IP core sent. In that way the test can identify and locate opens, shorts, and crosstalk on the SpaceCube board under test that could be due to manufacturing and assembly defects. The results of the test are read out of the IP core by the DUT software 2118 and sent back to the GSE 2106 to determine if the test passed or failed. Since PRBS sequences (pseudorandom binary sequences) are deterministic, the exact data sequence sent during the test is repeatable every time it is run.

For memory devices on the SpaceCube board, the DUT software 2118 commands the memory controller FPGA IP cores 2119 in order to run a suite of memory tests. These memory tests include reading and writing typical test patterns (walking ones, walking zeros, all zeros, all ones, address, etc.) to exercise the memory devices on the board and again locate device issues as well as board manufacturing and assembly defects.

The Functional Test Suite 2100 also tests a Rad-Hard Monitor (RHM) 1226 that interfaces on the SpaceCube v3.0 board. The RHM is a Field Programmable Gate Array (FPGA). The term "rad-hard", or "radiation-hardened", refers to electronic products used in space, satellite, nuclear plant and military applications, that are designed and built to be less susceptible to damage from exposure to radiation and extreme temperatures, such as to withstand cosmic rays and other natural electromagnetic radiation, as well as nuclear explosions. The effects of such radiation can be a temporary alteration or a slow degradation of the semiconductor elements in memory cells and transistors. If either a cell or transistor is induced to change its state, it can cause a program to crash. As the elements in a chip are made smaller, radiation has an increasingly greater and harmful influence. "Rad hard" products are highly insulated from the outside world. In addition, devices may be built with redundant components at the system level or at the circuit level, and error-correcting memories can detect and correct a memory failure.

The RHM 2126 implements a number of key features including a SpaceWire router 2128, a SelectMAP controller that can configure the Xilinx FPGA 2116, and a NAND Flash 2130 interface. The GSE 2106 communicates directly with a RHM SpaceWire port. It tests the SpaceWire router 2128 the same way as mentioned previously by sending a deterministic test pattern to the router which forwards it to a SpaceWire port of the Xilinx FPGA 2116 attached to the SpaceWire router 2128. Then the DUT software 2118 on the Xilinx FPGA 2116 sends the same data back through the RHM Router 2128 to the GSE 2106 for verification. To test the SelectMAP interface, the GSE 2106 sends the command sequence to transfer a Xilinx bit-file to the RHM 2126 and the subsequent commands to trigger the configuration. It then verifies that the Xilinx FPGA 2116 is correctly configured with the right bit-file. The NAND Flash 2130 interface of the RHM 2126 is tested in a similar way to the memory tests described previously.

The DUT software 2118 attempts to rely on as few hardware components as possible for each functional test. This is so that when testing a particular component A, board issues with an unrelated component B will not affect the running test and provide erroneous results or make isolating the source of the error difficult. For example, the DUT software 2118 should not be stored on or loaded from a SpaceCube DDR SDRAM memory to execute other tests (especially if DUT software is for testing the DDR SDRAM memory itself).

The exact test configuration depends on which board(s) are being tested. In the case of the SpaceCube v3.0 Mini processor (or similar processors), the board is installed into a board or system that provides power to the SpaceCube processor and breaks out all the SpaceCube processor's external interfaces. For SpaceCube v3.0 Mini, this card is a Mini Active Eval Kit.

In addition to commanding the functional tests and verifying results, the GSE software 2112 can also control and monitor the power supplies 2120 that power the other GSE and the SpaceCube board under test. The monitoring function allows the GSE software to observe currents and voltages that exceed the expected values and take corrective action. One mitigation is to power off the SpaceCube board 2100 under test and the associated GSE 2106 and put it in a safe condition. These power exceedances could be due to issues with the manufacturing of the particular board being tested, and the responsible engineer could investigate the cause further.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A radhard monitor being a RadHard field programmable gate array (FPGA) comprising:
   a Finite State Machine (FSM) configured to handle startup behavior and help to configure an outer FPGA device;
   watchdog timers;
   a SelectMAP (SMAP) controller,
   a NAND flash memory controller and a NAND flash memory client;
   at least one NAND flash memory device, wherein the NAND flash memory device is electrically connected to the NAND flash memory controller;
   a SpaceWire router,
   a register file, and
   a Remote Memory Access Protocol (RMAP) target;
   wherein the SpaceWire router is operatively connected to the register file and the NAND flash memory client through the RMAP target;
   wherein the FSM is operatively connected to the register file and the SMAP controller;
   wherein the register file is operatively connected to the watchdog timers and the SMAP controller.

2. The radhard monitor as defined in claim 1, wherein the the NAND flash memory client is configured to receive instructions from both the RMAP target, and the register file and the NAND flash memory client is configured to provide instructions to the NAND flash memory controller.

3. The radhard monitor as defined in claim 1, wherein the NAND flash memory client is operatively connected to the NAND flash memory controller.

4. The radhard monitor as defined in claim 1, further comprising an Analog-to-Digital Converter (ADC) controller, and a temperature monitor operatively connected to the register file.

5. A mini ASTM (Automated Safe-to-Mate) board adapted to connect a Mini Processor Card to an ASTM Machine for automated electrical testing of the Mini Processor Card, the mini ASTM board comprising:
   a printed circuit board;
   a first connector provided for receiving the Mini Processor Card, the first connector having a plurality of pins; and
   a plurality of second connectors each electrically connected to at least one of the plurality of pins of the first connector;
   the first connector and the second connectors mounted to the printed circuit board;
   the second connectors configured to be operatively connected to the ASTM Machine,
   wherein all ground and power nets on the Mini Processor Card are separated in the mini ASTM board.

6. The mini ASTM board as defined in claim 5, wherein the first connector is a 400-pin SAMTEC SEARA Y connector.

7. The mini ASTM board as defined in claim 5, wherein each of the second connectors is a 78-pin D-Subminiature connector.

8. An FPGA Mezzanine Card Plus (FMC+) Automated Safe-to-Mate (ASTM) board for connecting a card based on the FMC or FMC+ standard to an ASTM Machine for automated electrical testing of the card based on the FMC or FMC+ standard, the FMC+ ASTM board comprising:
- a printed circuit board;
- a first connector provided for receiving the card based on the FMC or FMC+ standard, the first connector having a plurality of pins; and
- a plurality of second connectors each electrically connected to at least one of the plurality of pins of the first connector;
- the first connector and the second connectors mounted to the printed circuit board;
- the second connectors configured to be operatively connected to the ASTM Machine,
- wherein all ground and power nets on the card based on the FMC or FMC+ standard are separated in the FMC+ ASTM board.

9. The FMC+ ASTM board as defined in claim 8, wherein the first connector is a 560-pin SAMTEC SEARA Y connector.

10. The FMC+ ASTM board as defined in claim 8, wherein each of the second connectors is a 78-pin D-Sub-miniature connector.

11. A Mini Evaluation Board (MEB) comprising:
- a Mini Processor Card (Mini) connector;
- a plurality of low voltage power supplies configured to provide power to the Mini connector and FMC+ connector, wherein a power switch controls power to the Mini connector to ensure voltages are within a predetermined range;
- an FPGA Mezzanine Card Plus (FMC+) connector electrically connected to the Mini connector;
- a plurality of Space Wire ports operatively connected to the Mini connector through a first transceiver;
- a plurality of RS-422 ports operatively connected to the Mini connector through a second transceiver;
- Joint Test Action Group (JTAG) programming connectors operatively connected to the Mini connector; and
- a current monitoring Analog-to-Digital Converter (ADC) configured to read out current for each of the low voltage power supplies, the current monitoring ADC is electrically connected to the Mini connector.

12. The Mini Evaluation Board as defined in claim 11, wherein the FMC+ connector is configured to receive a Commercial Off the Shelf (COTS) card or a custom Mezzanine card therein and to provide interfaces from a Mini Processor Card to the COTS or the custom Mezzanine card.

13. The Mini Evaluation Board as defined in claim 11, wherein the Mini connector is a 400-pin backplane connector.

14. The Mini Evaluation Board as defined in claim 11, further comprising an Ethernet port electrically connected to the Mini connector.

15. A Mezzanine Test Card (MEZZ) being a multi-use GSE (Ground Support Equipment) test board that is compatible with several different development platforms in a SpaceCube, the Mezzanine Test Card comprising:
- a connector provided to connect with a carrier card, wherein the carrier card is one of an evaluation board, a VPX board, a commercial FPGA Mezzanine Card Plus (FMC+), and a backplane connector;
- a clock generator providing a configurable reference clock back to the carrier card via the connector;
- an on-board CAN PHY operatively connected to the connector;
- a plurality of RS-422 ports operatively connected to the connector;
- a CameraLink interface used as a CameraLink Base or a CameraLink Medium, the CameraLink interface operatively connected to the connector;
- an Ethernet port operatively connected to the connector;
- a USB port configured to connect the Mezzanine Test Card to an external memory device; and
- a GPIO (general-purpose input/output) connector operatively connected to the connector.

16. The Mezzanine Test Card as defined in claim 15, wherein the connector is a FMC+ pin connector.

17. The Mezzanine Test Card as defined in claim 15, further comprising a pin header operatively connected to the on-board CAN PHY.

18. An automated functional test suite for testing a Space-Cube Processor Card including a field-programmable gate array (FPGA) with FPGA IP cores, the FPGA storing a Design Under Test (DUT) software, the automated functional test suite comprising:
- a Mini Active Evaluation Card configured to be operatively coupled to a SpaceCube Processor Card;
- power supplies provided for powering the SpaceCube Processor Card under test; and
- a test ground support equipment storing a GSE (Ground Support Equipment) software, the test ground support equipment operatively connected to the Mini Active Evaluation Card and connectable to the SpaceCube Processor Card;
- the GSE software configured to send a deterministic test pattern to the DUT software wherein the DUT software echoes the deterministic test pattern to the GSE software and the GSE software parses the echoed deterministic test pattern to look for errors, control and monitor the power supplies, configure the FPGA, and program the FPGA with the DUT software.

19. The automated functional test suite as defined in claim 18, wherein the SpaceCube Processor Card includes a Processor Card backplane connector, wherein the Mini Active Evaluation Card includes an Evaluation Card backplane connector, and wherein the SpaceCube Processor Card and the Mini Active Evaluation Card are operatively coupled to one another through the corresponding Processor Card backplane connector and the Evaluation Card backplane connector.

20. The automated functional test suite as defined in claim 18, further comprising external loopback boards or cables configured to connect data to the FPGA IP cores, wherein one of the external loopback boards or cables is operatively connected to the SpaceCube Processor Card, wherein one of the FPGA IP cores is configured to send out Pseudo-Random Binary Sequence (PRBS) serial data and receive a returned PRBS serial data via a loopback link to compare the sent PRBS serial data with the returned PRBS serial data, wherein the DUT software sends the comparison to the GSE software.

* * * * *